(12) United States Patent
Sadek

(10) Patent No.: US 9,445,278 B2
(45) Date of Patent: Sep. 13, 2016

(54) CLASSIFICATION-BASED ADAPTIVE TRANSMISSION IN UNLICENSED SPECTRUM

(71) Applicant: QUALCOMM Incorporated, San Diego, CA (US)

(72) Inventor: Ahmed Kamel Sadek, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/597,537

(22) Filed: Jan. 15, 2015

(65) Prior Publication Data

US 2015/0296384 A1 Oct. 15, 2015

Related U.S. Application Data

(60) Provisional application No. 61/978,688, filed on Apr. 11, 2014.

(51) Int. Cl.
*H04W 72/00* (2009.01)
*H04W 16/14* (2009.01)
(Continued)

(52) U.S. Cl.
CPC ......... *H04W 16/14* (2013.01); *H04W 72/1215* (2013.01); *H04W 88/10* (2013.01)

(58) Field of Classification Search
CPC . H04W 84/045; H04W 48/02; H04W 48/16; H04W 28/044; H04W 36/0083; H04W 4/005; H04W 4/08; H04W 74/0833; H04W 24/10; H04W 4/00; H04W 88/16; H04W 8/20; H04W 11/0093; H04W 11/00; H04W 12/66
See application file for complete search history.

(56) References Cited

U.S. PATENT DOCUMENTS 5,956,638 A 9/1999 Chang et al.
8,040,983 B2 10/2011 Li
(Continued)

FOREIGN PATENT DOCUMENTS

WO 2013006988 A1 1/2013
WO 2015047777 A2 4/2015
WO 2015047912 A2 4/2015

OTHER PUBLICATIONS

Beluri M., et al., "Mechanisms for LTE coexistence in TV white space", Dynamic Spectrum Access Networks (DYSPAN), 2012 IEEE International Symposium on, IEEE, Oct. 16, 2012, pp. 317-326, XP032342357, DOI: 10. 1109/DYSPAN.2012.6478155,ISBN: 978-1-4673-4447-0.
(Continued)

*Primary Examiner* — Nimesh Patel
(74) *Attorney, Agent, or Firm* — Muncy, Geissler, Olds & Lowe, P.C.

(57) ABSTRACT

Techniques for communication management between Radio Access Technologies (RATs) sharing operating spectrum in an unlicensed band of radio frequencies are disclosed. Interference may be mitigated by, for example, receiving signaling via a resource. A first RAT may be used to receive the signaling. Based on the received signaling, utilization of the resource associated with the first RAT may be identified. The identified utilization of the resource may be classified based on an attribute associated with the received signaling and a plurality of thresholds associated with the attribute. The plurality of thresholds may define different classes of utilization. Communication by a second RAT over the resource may be adapted based on the classified utilization of the resource.

30 Claims, 13 Drawing Sheets

(51) Int. Cl.
    *H04W 72/12*   (2009.01)
    *H04W 88/10*   (2009.01)

(56) References Cited

U.S. PATENT DOCUMENTS

| | | | |
|---|---|---|---|
| 8,175,539 B2 | 5/2012 | Diener et al. | |
| 2011/0237246 A1* | 9/2011 | Sen | H04W 72/082 455/426.1 |
| 2012/0307744 A1* | 12/2012 | Charbit | H04W 72/1205 370/329 |
| 2013/0083661 A1* | 4/2013 | Gupta | H04W 4/005 370/235 |
| 2013/0142116 A1* | 6/2013 | Prakash | H04W 16/14 370/328 |
| 2013/0201884 A1 | 8/2013 | Freda et al. | |
| 2013/0208587 A1 | 8/2013 | Bala et al. | |
| 2013/0322279 A1 | 12/2013 | Chincholi et al. | |
| 2015/0065144 A1* | 3/2015 | Shen | H04W 36/0066 455/438 |
| 2015/0085684 A1 | 3/2015 | Sadek | |
| 2015/0085841 A1 | 3/2015 | Sadek | |
| 2015/0133184 A1* | 5/2015 | Sadek | H04W 36/14 455/552.1 |

OTHER PUBLICATIONS

International Search Report and Written Opinion—PCT/US2015/024538—ISAEPO—Jul. 13, 2015.

* cited by examiner

CLASSIFICATION-BASED ADAPTIVE TRANSMISSION IN UNLICENSED SPECTRUM

CROSS-REFERENCE TO RELATED APPLICATIONS

The present Application for Patent claims the benefit of U.S. Provisional Application No. 61/978,688, entitled "MULTI-LEVEL ADAPTIVE TRANSMISSION IN UNLICENSED SPECTRUM," filed Apr. 11, 2014, assigned to the assignee hereof, and expressly incorporated herein by reference in its entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" base stations provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power base stations have recently begun to be deployed to supplement conventional macro networks. Small cell base stations may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for adaptive transmission and related operations in unlicensed spectrum are disclosed.

In one example, a method for communication management between Radio Access Technologies (RATs) sharing operating spectrum in an unlicensed band of radio frequencies is disclosed. The method may include, for example, receiving signaling via a medium, wherein a first RAT is used to receive the signaling; identifying utilization of the medium associated with the first RAT based on the received signaling; classifying the identified utilization of the medium based on an attribute associated with the received signaling and a plurality of thresholds associated with the attribute, wherein the plurality of thresholds define different classes of utilization; and adapting communication by a second RAT over the medium based on the classified utilization of the medium.

In another example, an apparatus for communication management between RATs sharing operating spectrum in an unlicensed band of radio frequencies is also disclosed. The apparatus may comprise, for example, first and second transceivers and a processor. The first transceiver may be configured to receive signaling via a medium, wherein a first RAT is used to receive the signaling. The processor may be configured to identify utilization of the medium associated with the first RAT based on the received signaling, and to classify the identified utilization of the medium based on an attribute associated with the received signaling and a plurality of thresholds associated with the attribute, wherein the plurality of thresholds define different classes of utilization. The second transceiver may be configured to adapt communication by a second RAT over the medium based on the classified utilization of the medium.

In another example, another apparatus for communication management between RATs sharing operating spectrum in an unlicensed band of radio frequencies is also disclosed. The apparatus may comprise, for example, means for receiving signaling via a medium, wherein a first RAT is used to receive the signaling; means for identifying utilization of the medium associated with the first RAT based on the received signaling; means for classifying the identified utilization of the medium based on an attribute associated with the received signaling and a plurality of thresholds associated with the attribute, wherein the plurality of thresholds define different classes of utilization; and means for adapting communication by a second RAT over the medium based on the classified utilization of the medium.

In another example, a computer-readable medium that comprises instructions, which, when executed by a processor, cause the processor to perform operations for communication management between RATs sharing operating spectrum in an unlicensed band of radio frequencies is also disclosed. The computer-readable medium may comprise, for example: instructions for receiving signaling via a medium, wherein a first RAT is used to receive the signaling; instructions for identifying utilization of the medium associated with the first RAT based on the received signaling; instructions for classifying the identified utilization of the medium based on an attribute associated with the received signaling and a plurality of thresholds associated with the attribute, wherein the plurality of thresholds define different classes of utilization; and instructions for adapting communication by a second RAT over the medium based on the classified utilization of the medium.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to techniques for co-existence between wireless Radio Access Technologies (RATs). In one aspect, by classifying the extent to which shared operating spectrum on an unlicensed band is being utilized by another RAT (e.g., Wi-Fi), a small cell base station or associated user device operating according to its own RAT (e.g., LTE) may be able to better discern light loading from heavy loading of the shared operating spectrum, on a discrete or continuous scale, in accordance with a plurality of corresponding thresholds. The classification may be based on different attributes of the other-RAT's signaling, such as received signal strength, packet type, traffic type, a joint attribute associated with two related packets, and so on. In another aspect, one or more different communication parameters for different communication schemes, including both Carrier Sense Adaptive Transmission (CSAT) schemes and Listen Before Talk (LBT) schemes, may be accordingly adapted based on the classified utilization of the shared operation spectrum.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
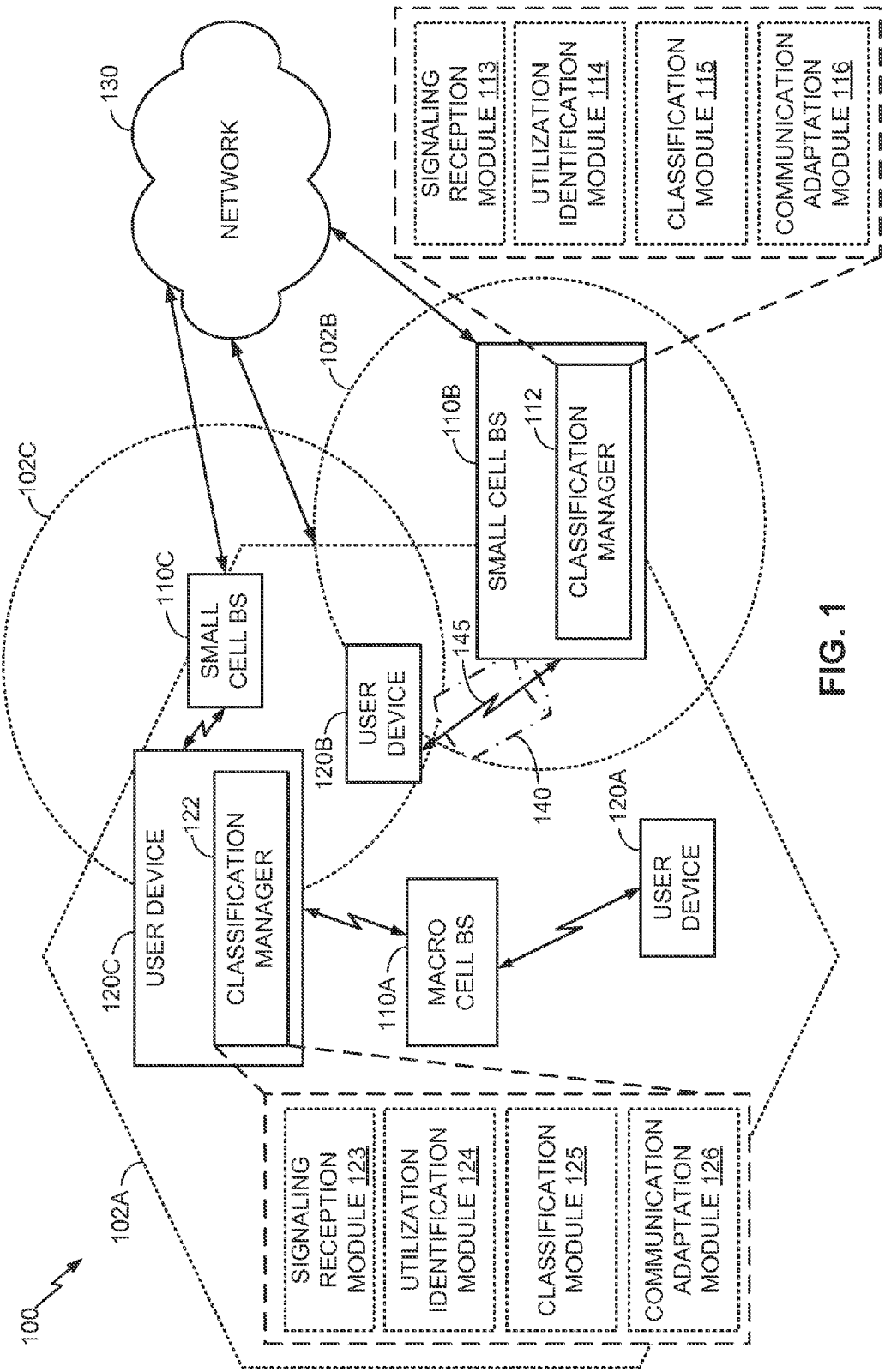
FIG. 1 illustrates an example mixed-deployment wireless communication system including macro cell base stations and small cell base stations.

FIG. 1 illustrates an example mixed-deployment wireless communication system, in which small cell base stations are deployed in conjunction with, and to supplement the coverage of macro cell base stations. As used herein, small cells generally refer to a class of low-powered base stations that may include or be otherwise referred to as femto cells, pico cells, micro cells, etc. As noted in the background above, small cells may be deployed to provide improved signaling, incremental capacity growth, richer user experience, and so on.

The illustrated wireless communication system 100 is a multiple-access system that is divided into a plurality of cells 102A-102C and configured to support communication for a number of users. Communication coverage in each of the cells 102A-102C is provided by a corresponding base station 110A-110C, which interacts with one or more user devices 120A-120C via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the medium utilization classification discussed briefly above. For example, the small cell base station 110B may include a classification manager 112, which may include, by way of example, a signaling reception module 113, a utilization identification module 114, a classification module 115, and a communication adaptation module 116. Similarly, the user device 120C may include a classification manager 122, which may include, by way of example, a signaling reception module 123, a utilization identification module 124, a classification module 125, and a communication adaptation module 126.

The classification manager 112 and the classification manager 122 may be configured via their respective modules to perform classification with respect to a medium of interest for communication, such as the medium 140 shown by way of example in FIG. 1, over which signaling 145 is communicated between the small cell base station 110B and the user device 120B. A medium may be composed of one or more frequency, time, and/or space communication resources (e.g., encompassing one or more channels across one or more carriers) associated with communication between one or more transmitter/receiver pairs (e.g., the small cell base station 110B and the user device 120B for the medium 140).

Figures 8, 9:
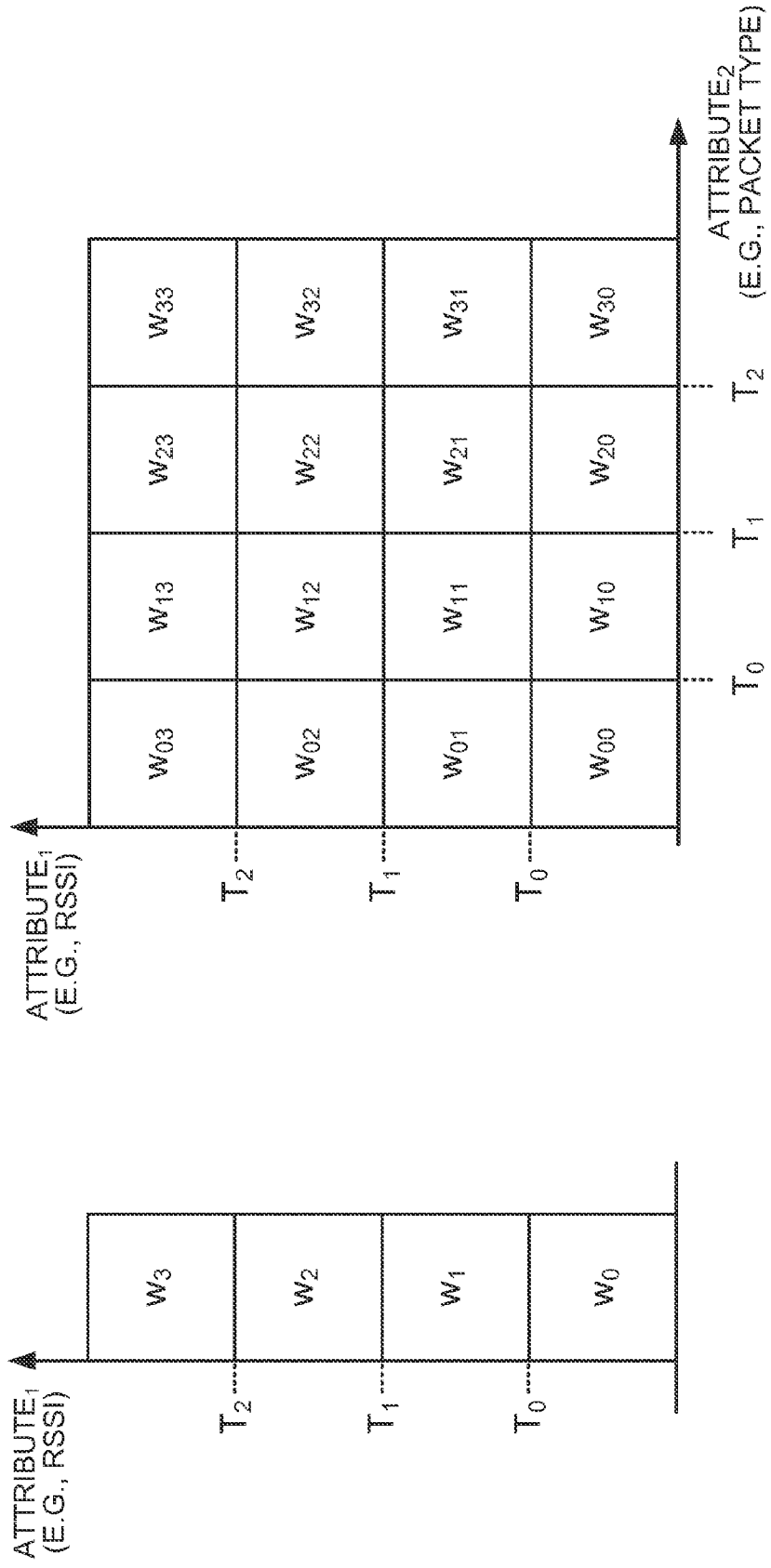
FIG. 8 illustrates a single attribute classification scheme, according to one example.
FIG. 9 illustrates a double attribute classification scheme, according to another example.

Additional information about the classification managers 112 and 122, signaling reception modules 113 and 123, utilization identification modules 114 and 124, classification modules 115 and 125, and communication adaptation modules 116 and 126 are provided with respect to FIGS. 8-9.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, entertainment device, Internet of Things (JOT)/Internet of Everything (JOE) capable device, in-vehicle communication device, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110A-110C include an example macro cell base station 110A and two example small cell base stations 110B, 110C. The macro cell base station 110A is configured to provide communication coverage within the cell 102A, which may cover a few blocks within a neighborhood or several square miles in a rural environment. Meanwhile, the small cell base stations 110B and 110C are configured to provide communication coverage within the respective cells 102B and 102C, with varying degrees of overlap existing among the different coverage areas. In some systems, each cell may be further divided into one or more sectors (not shown).

Turning to the illustrated connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further illustrated in FIG. 1, the macro cell base station 110A may communicate with a corresponding wide area or external network 130, via a wired link or via a wireless link, while the small cell base stations 110B and 110C may also similarly communicate with the network 130, via respective wired or wireless links. For example, the small cell base stations 110B and 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B and 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For the respective wireless air interfaces, each base station 110A-110C may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "$3^{rd}$ Generation Partnership Project" (3GPP). Cdma2000 is described in documents from an organization named "$3^{rd}$ Generation Partnership Project 2" (3GPP2). These documents are publicly available.

For illustration purposes, an example downlink and uplink frame structure for an LTE signaling scheme is described below with reference to FIGS. 2-3, respectively.

Figure 2:
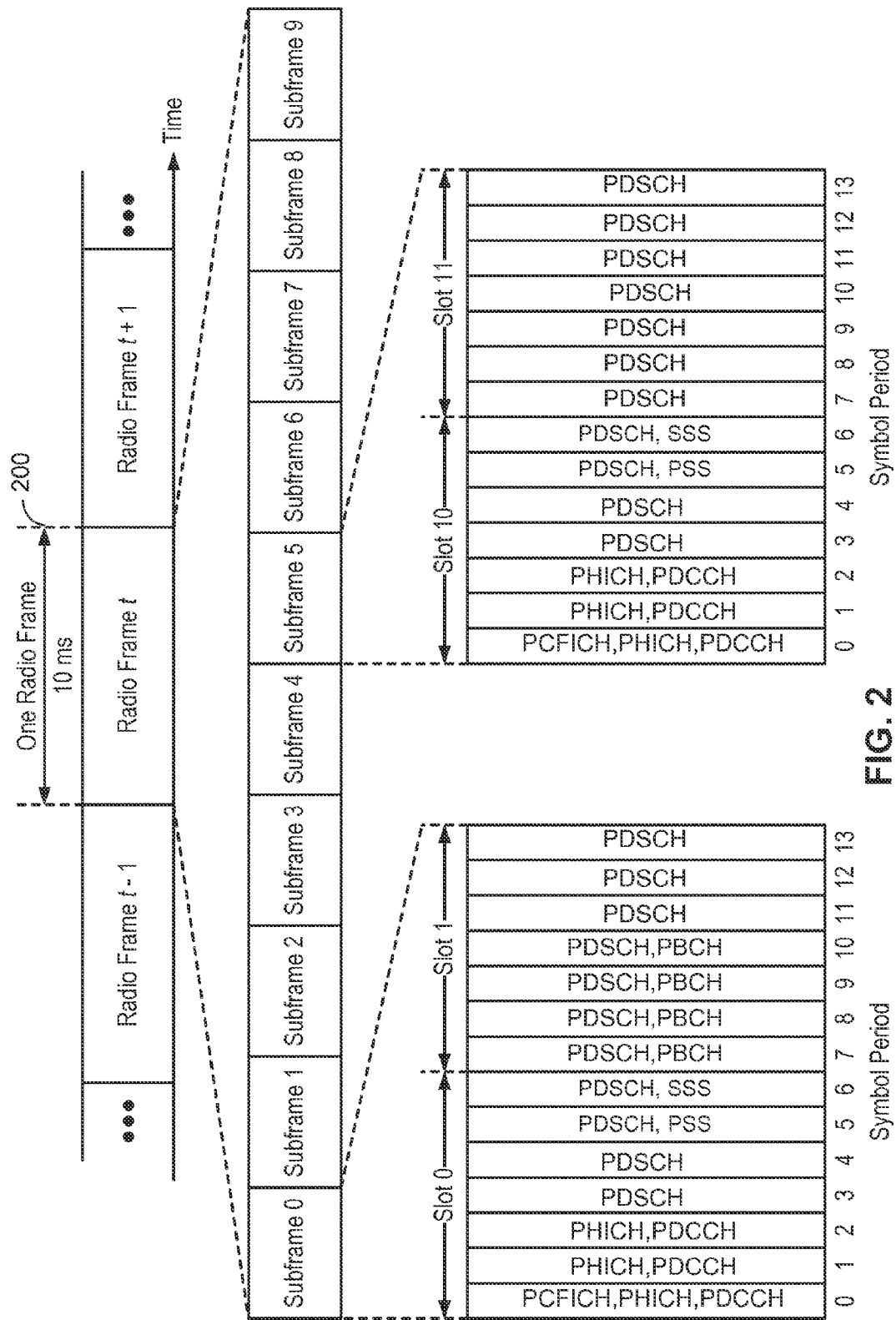
FIG. 2 is a block diagram illustrating an example downlink frame structure for LTE communications.

FIG. 2 is a block diagram illustrating an example downlink frame structure for LTE communications. In LTE, the base stations 110A-110C of FIG. 1 are generally referred to as eNBs and the user devices 120A-120C are generally referred to as UEs, The transmission timeline for the downlink may be partitioned into units of radio frames. Each radio frame (shown by way of example as a radio frame t 200, between radio frames t−1 and t+1) may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 5 and 6, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

Reference signals are transmitted during the first and fifth symbol periods of each slot when the normal cyclic prefix is used and during the first and fourth symbol periods when the extended cyclic prefix is used. For example, the eNB may send a Cell-specific Reference Signal (CRS) for each cell in the eNB on all component carriers. The CRS may be sent in symbols 0 and 4 of each slot in case of the normal cyclic prefix, and in symbols 0 and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In one aspect, the eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs, A number of resource elements may be available in each symbol period. Each resource element may cover one subcarrier in one symbol period and may be used to send one modulation symbol, which may be a real or complex value. Resource elements not used for a reference signal in each symbol period may be arranged into Resource Element Groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 3:
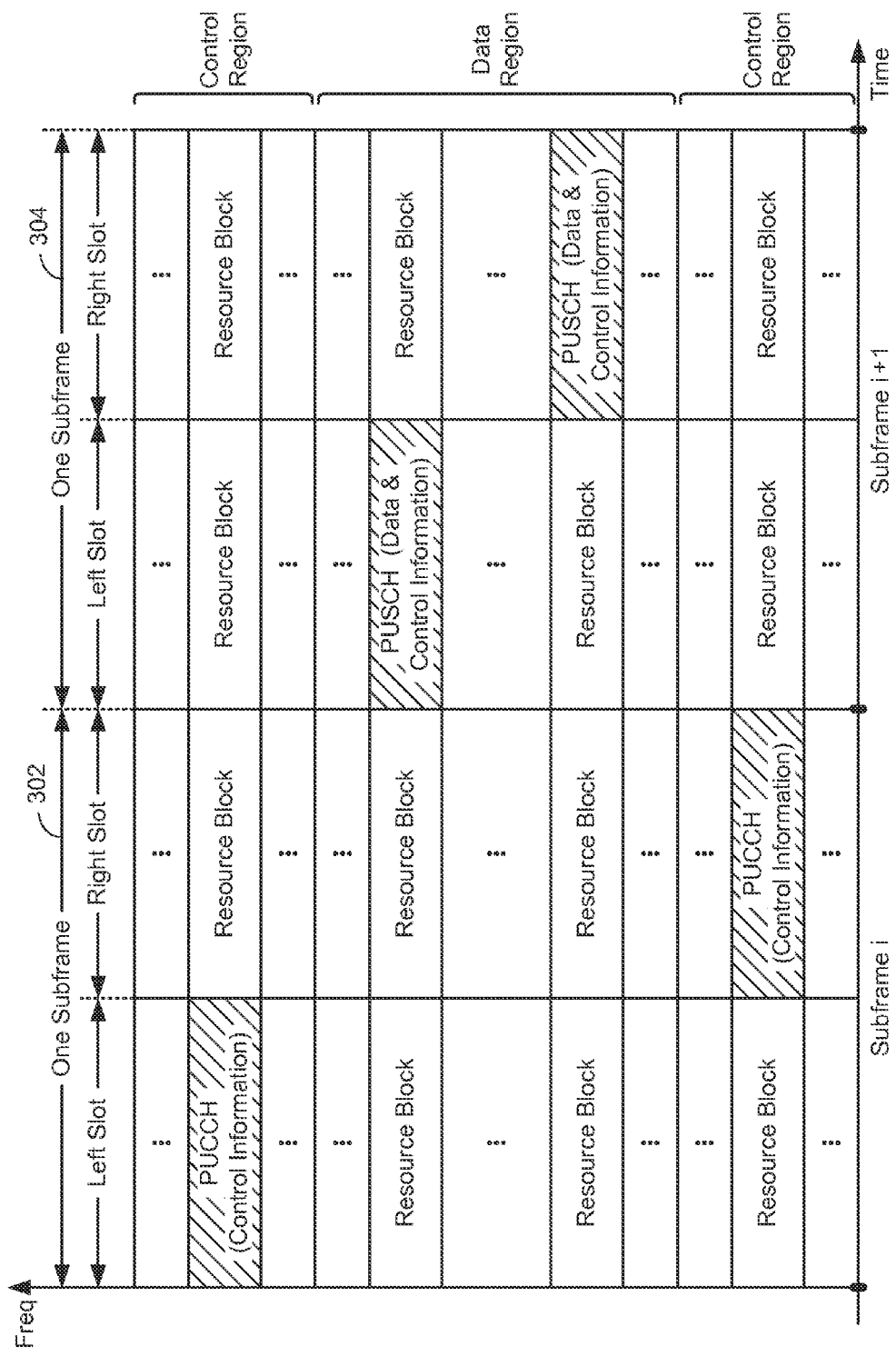
FIG. 3 is a block diagram illustrating an example uplink frame structure for LTE communications.

FIG. 3 is a block diagram illustrating an example uplink frame structure for LTE communications. The available resource blocks (which may be referred to as RBs) for the UL may be distributed across frequency space and time, as shown, and partitioned into a data region and a control region. In this example, two subframes are shown for illustration purposes (Subframe i 302 and Subframe i+1 304), with each subframe being divided into a left slot and a right slot. The control region may be formed at the two edges of the system bandwidth and may have a configurable size. The resource blocks in the control region may be assigned to UEs for transmission of control information. The data region may include all resource blocks not included in the control region. The design in FIG. 3 results in the data region including contiguous subcarriers, which may allow a single UE to be assigned all of the contiguous subcarriers in the data region.

A UE may be assigned resource blocks in the control region to transmit control information to an eNB. The UE may also be assigned resource blocks in the data region to transmit data to the eNB. The UE may transmit control information in a Physical Uplink Control Channel (PUCCH) on the assigned resource blocks in the control region. The UE may transmit only data or both data and control information in a Physical Uplink Shared Channel (PUSCH) on the assigned resource blocks in the data region. An uplink transmission may span both slots of a subframe and may hop across frequency as shown in FIG. 3.

Returning to FIG. 1, cellular systems such as LTE are typically confined to one or more licensed frequency bands that have been reserved for such communications (e.g., by a government entity such as the Federal Communications Commission (FCC) in the United States). However, certain communication systems, in particular those employing small cell base stations as in the design of FIG. 1, have extended cellular operations into unlicensed frequency bands such as the Unlicensed National Information Infrastructure (U-NII) band used by Wireless Local Area Network (WLAN) technologies. For illustration purposes, the description below may refer in some respects to an LTE system operating on an unlicensed band by way of example when appropriate, although it will be appreciated that such descriptions are not intended to exclude other cellular communication technologies. LTE on an unlicensed band may also be referred to herein as LTE/LTE-Advanced in unlicensed spectrum, or simply LTE in the surrounding context. With reference to FIGS. 2-3 above, the PSS, SSS, CRS, PBCH, PUCCH, and PUSCH in LTE on an unlicensed band are otherwise the same or substantially the same as in a licensed band.

The unlicensed spectrum may be employed by cellular systems in different ways. For example, in some systems, the unlicensed spectrum may be employed in a standalone configuration, with all carriers operating exclusively in an unlicensed portion of the wireless spectrum (e.g., LTE Standalone, etc.). In other systems, the unlicensed spectrum may be employed in a manner that is supplemental to licensed band operation by utilizing one or more unlicensed carriers operating in the unlicensed portion of the wireless spectrum in conjunction with an anchor licensed carrier operating in the licensed portion of the wireless spectrum (e.g., LTE Supplemental DownLink (SDL), etc.). In either case, carrier aggregation may be employed to manage the different component carriers, with one carrier serving as the Primary Cell (Pcell) for the corresponding user (e.g., an anchor licensed carrier in LTE SDL or a designated one of the unlicensed carriers in LTE Standalone) and the remaining carriers serving as respective Secondary Cells (Scells). In this way, the Pcell may provide a Frequency Division Duplexed (FDD) pair of downlink and uplink carriers (licensed or unlicensed), with each Scell providing additional downlink capacity as desired.

The extension of small cell operation into unlicensed frequency bands such as the U-NII (5 GHz) band may therefore be implemented in a variety of ways and increase the capacity of cellular systems such as LTE. As discussed briefly in the background above, however, it may also encroach on the operations of other "native" RATs that typically utilize the same unlicensed band, most notably IEEE 802.11x WLAN technologies generally referred to as "Wi-Fi."

In some small cell base station designs, the small cell base station may include such a native RAT radio (native with respect to the unlicensed band) that is "co-located" with the small cell base station's cellular RAT radio. According to various aspects described herein, the small cell base station may leverage the co-located, native RAT radio to facilitate co-existence with the cellular RAT radio when operating on a shared unlicensed band. For example, the co-located, native RAT radio may be used to conduct different measurements on the unlicensed band and dynamically determine the extent to which the unlicensed band is being utilized by devices operating in accordance with the native RAT. The cellular radio's use of the shared unlicensed band may then be specially adapted to balance the desire for efficient cellular operation against the need for stable co-existence.

Figure 4:
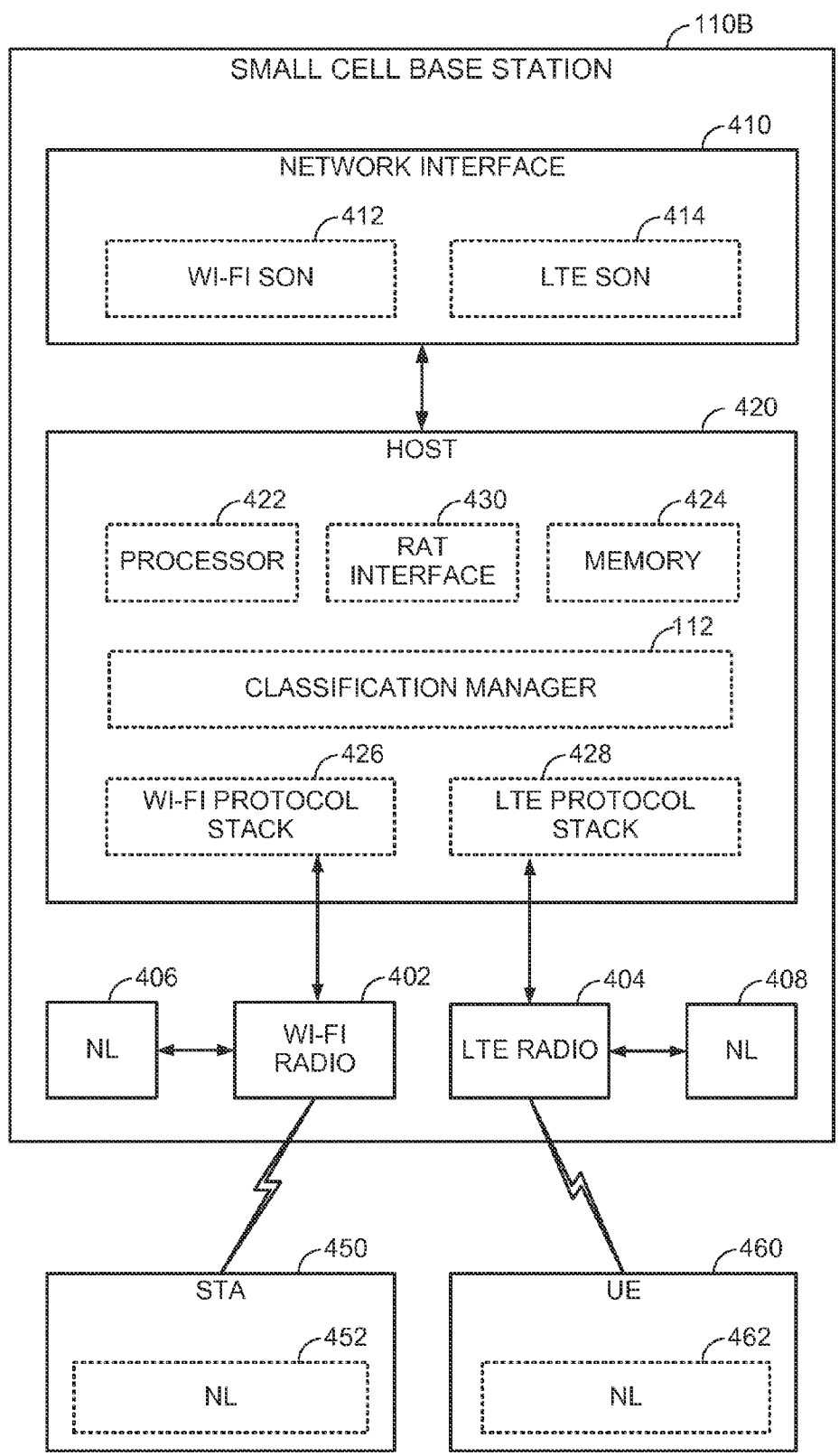
FIG. 4 illustrates an example small cell base station with co-located radio components (e.g., LTE and Wi-Fi) configured for unlicensed spectrum operation.

FIG. 4 illustrates an example small cell base station with co-located radio components configured for unlicensed spectrum operation. The small cell base station here may correspond, for example, to the small cell base station 110B illustrated in FIG. 1 as including the classification manager 112. In this example, the small cell base station 110B is configured to provide a WLAN air interface (e.g., in accordance with an IEEE 802.11x protocol) in addition to a cellular air interface (e.g., in accordance with an LTE protocol). For illustration purposes, the small cell base station 110B is shown as including a Wi-Fi (e.g., 802.11x) radio component/module (e.g., transceiver) 402 co-located with an LTE radio component/module (e.g., transceiver) 404.

As used herein, the term co-located (e.g., radios, base stations, transceivers, etc.) may include in accordance with various aspects, one or more of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging). In some designs, the advantages discussed herein may be achieved by adding a radio component of the native unlicensed band RAT of interest to a given cellular small cell base station without that base station necessarily providing corresponding communication access via the native unlicensed band RAT (e.g., adding a Wi-Fi chip or similar circuitry to an LTE small cell base station, etc.). If desired, a low functionality Wi-Fi circuit may be employed to reduce costs (e.g., a Wi-Fi receiver simply providing low-level sniffing).

Returning to FIG. 4, the Wi-Fi radio 402 and the LTE radio 404 may perform monitoring of a medium (e.g., one or more channels on one or more corresponding carrier frequencies) to perform various corresponding operating channel or environment measurements (e.g., Channel Quality Indicator (CQI), Received Signal Strength Indicator (RSSI), Reference Signal Received Power (RSRP), other Radio Link Monitoring (RLM) measurements, etc.) using corresponding Network/Neighbor Listen (NL) modules 406 and 408, respectively, or any other suitable component(s).

The small cell base station 110B may communicate with one or more user devices via the Wi-Fi radio 402 and the LTE radio 404, illustrated as an STA 450 and a UE 460, respectively. Similar to the Wi-Fi radio 402 and the LTE radio 404, the STA 450 includes a corresponding NL module 452 and the UE 460 includes a corresponding NL module 462 for performing various medium (e.g., operating channel or environment) measurements, either independently or under the direction of the Wi-Fi radio 402 and the LTE radio 404, respectively. In this regard, the measurements may be retained at the STA 450 and/or the UE 460, or reported to the Wi-Fi radio 402 and the LTE radio 404, respectively, with or without any pre-processing being performed by the STA 450 or the UE 460.

While FIG. 4 shows a single STA 450 and a single UE 460 for illustration purposes, it will be appreciated that the small cell base station 110B can communicate with multiple STAs and/or UEs. Additionally, while FIG. 4 illustrates one type of user device communicating with the small cell base station 110B via the Wi-Fi radio 402 (i.e., the STA 450) and another type of user device communicating with the small cell base station 110B via the LTE radio 404 (i.e., the UE 460), it will be appreciated that a single user device (e.g., a smartphone) may be capable of communicating with the small cell base station 110B via both the Wi-Fi radio 402 and the LTE radio 404, either simultaneously or at different times.

As is further illustrated in FIG. 4, the small cell base station 110B may also include a network interface 410, which may include various components for interfacing with corresponding network entities (e.g., Self-Organizing Network (SON) nodes), such as a component for interfacing with a Wi-Fi SON 412 and/or a component for interfacing with an LTE SON 414. The small cell base station 110B may also include a host 420, which may include one or more general purpose controllers or processors 422 and memory 424 configured to store related data and/or instructions. As shown, the host 420 may also include the classification manager 112, which may operate, for example, in a stand-alone configuration or in conjunction with the general purpose controllers or processors 422 and memory 424, to provide or otherwise support the medium utilization classification discussed herein. The host 420 may also perform processing in accordance with the appropriate RAT(s) used for communication (e.g., via a Wi-Fi protocol stack 426 and/or an LTE protocol stack 428), as well as other functions for the small cell base station 110B. In particular, the host 420 may further include a RAT interface 430 (e.g., a bus or the like) that enables the Wi-Fi radio 402 and LTE radio 404 to communicate with one another via various message exchanges.

Figure 5:
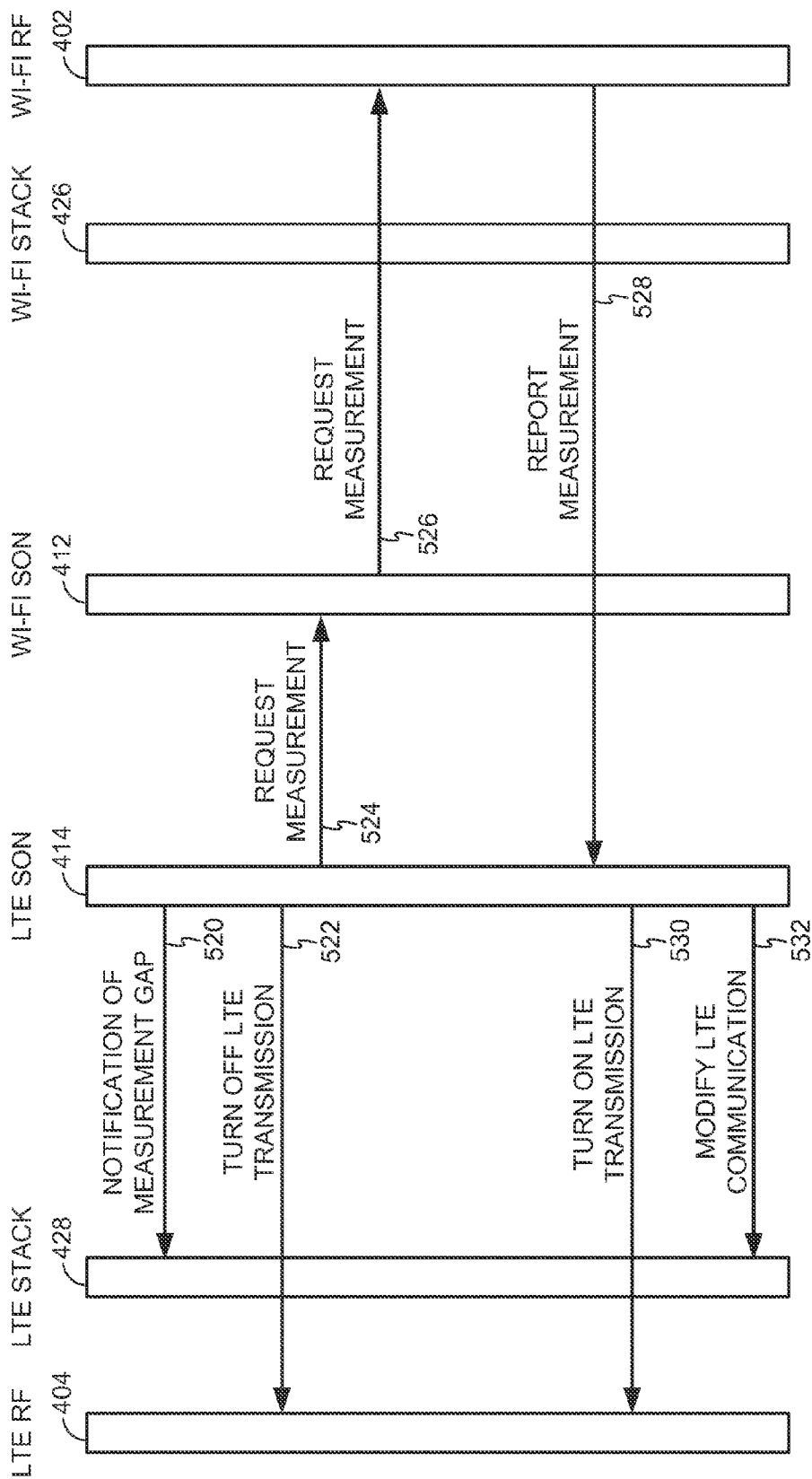
FIG. 5 is a signaling flow diagram illustrating an example message exchange between co-located radios.

FIG. 5 is a signaling flow diagram illustrating an example message exchange between co-located radios. In this example, one RAT (e.g., LTE) requests a measurement from another RAT (e.g., Wi-Fi) and opportunistically ceases transmission for the measurement. FIG. 5 will be explained below with continued reference to FIG. 4.

Initially, the LTE SON 414 notifies the LTE protocol stack 428 via a message 520 that a measurement gap is upcoming on the shared unlicensed band. The LTE SON 414 then sends a command 522 to cause the LTE radio (RF) 404 to temporarily turn off transmission on the unlicensed band, in response to which the LTE radio 404 disables the appropriate RF components for a period of time (e.g., to not interfere with any measurements during this time).

The LTE SON 414 also sends a message 524 to the co-located Wi-Fi SON 412 requesting that a measurement be taken on the unlicensed band. In response, the Wi-Fi SON 412 sends a corresponding request 526 via the Wi-Fi protocol stack 426 to the Wi-Fi radio 402, or some other suitable Wi-Fi radio component (e.g., a low cost, reduced functionality Wi-Fi receiver).

After the Wi-Fi radio 402 conducts measurements for Wi-Fi related signaling on the unlicensed band, a report 528 including the results of the measurements is sent to the LTE SON 414 via the Wi-Fi protocol stack 426 and the Wi-Fi SON 412. In some instances, the measurement report may include not only measurements performed by the Wi-Fi radio 402 itself, but also measurements collected by the Wi-Fi radio 402 from the STA 450. The LTE SON 414 may then send a command 530 to cause the LTE radio 404 to turn back on transmission on the unlicensed band (e.g., at the end of the defined period of time).

The information included in the measurement report (e.g., information indicative of how Wi-Fi devices are utilizing the unlicensed band) may be compiled along with various LTE measurements and measurement reports. Based on information about the current operating conditions on the shared unlicensed band (e.g., as collected by one or a combination of the Wi-Fi radio 402, the LTE radio 404, the STA 450, and/or the UE 460), the small cell base station 110B may specially adapt different aspects of its cellular operations in order to manage co-existence between the different RATs. Returning to FIG. 5, the LTE SON 414, for example, may then send a message 532 that informs the LTE protocol stack 428 how LTE communication is to be modified.

Although shown for illustration purposes in FIGS. 4-5, it will be appreciated that in some systems the Wi-Fi SON 412 and LTE SON 414 may be optional or omitted altogether, and may therefore be bypassed, in whole or in part, in other example measurement schemes.

There are several aspects of cellular operation that may be adapted in order to manage co-existence between the different RATs. For example, the small cell base station 110B may select certain carriers as preferable when operating in the unlicensed band, may opportunistically enable or disable operation on those carriers, may selectively adjust the transmission power of those carriers, if necessary (e.g., periodically or intermittently in accordance with a transmission pattern), and/or take other steps to balance the desire for efficient cellular operation against the need for stable co-existence.

Figure 6:
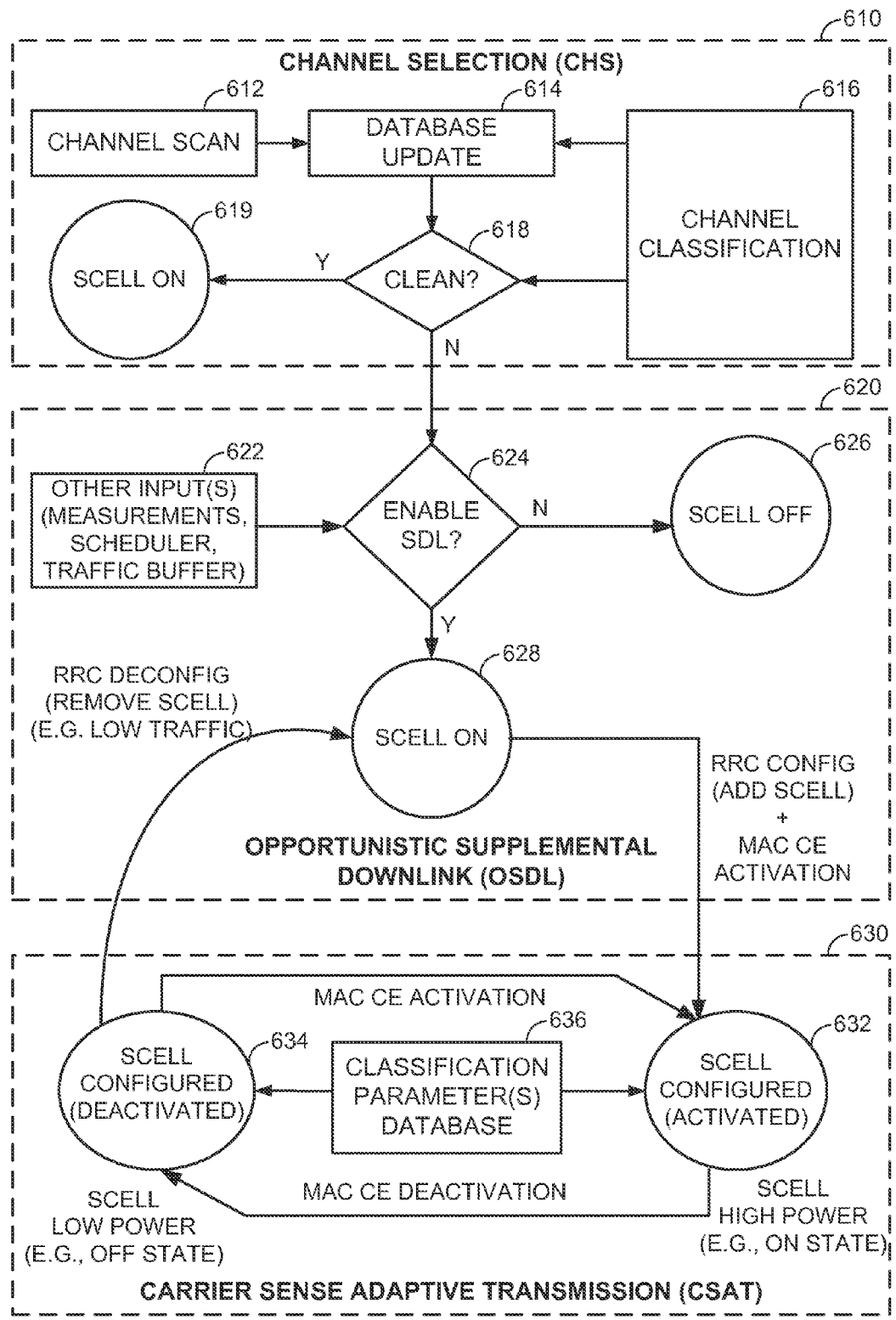
FIG. 6 is a system-level co-existence state diagram illustrating different aspects of cellular operation that may be specially adapted to manage co-existence between different RATs operating on a shared unlicensed band, according to one example.

FIG. 6 is a system-level co-existence state diagram illustrating different aspects of cellular operation that may be specially adapted to manage co-existence between different RATs operating on a shared unlicensed band, according to one example. As shown, the techniques in this example include operations that will be referred to herein as Channel Selection (CHS) where appropriate unlicensed carriers are analyzed, Opportunistic Supplemental Downlink (OSDL) where operation on one or more corresponding Scells in the unlicensed band is configured or deconfigured, and Carrier Sense Adaptive Transmission (CSAT) where the transmission power on the configured Scells is adapted, if necessary, by cycling between periods of high transmission power (e.g., an ON state, as a special case) and low transmission power (e.g., an OFF state, as a special case). As discussed in more detail below, the associated user devices may be activated and deactivated accordingly.

For Channel Selection (CHS) (block 610), a channel selection algorithm may perform certain periodic or event-driven scanning procedures (e.g., initial or threshold triggered) on a medium of interest (block 612), such as the medium 140 described above with reference to FIG. 1. With reference to FIG. 4, the channel selection algorithm may be performed by the processor 422 in conjunction with the memory 424, for example, and the scanning procedures may utilize, for example, one or a combination of the Wi-Fi radio 402, the LTE radio 404, the STA 450, and/or the UE 460. The scan results may be stored (e.g., over a sliding time window) in a corresponding database (block 614) and used to classify the different channels on the medium in terms of their potential for cellular operation (block 616). For example, a given channel may be classified, at least in part, based on whether it is a "clean" channel without substantial interference (e.g., below a threshold) or whether it will need to be afforded some level of protection for co-channel communications. Various cost functions and associated metrics may be employed in the classification and related calculations.

If a clean channel is identified ('yes' at decision 618), a corresponding Scell may be operated without concern for impacting co-channel communications (state 619). On the other hand, if no clean channel is identified, further processing may be utilized to reduce the impact on co-channel communications ('no' at decision 618), as described below.

Turning to Opportunistic Supplemental Downlink (OSDL) (block 620), input may be received from the channel selection algorithm as well as from other sources, such as various measurements, schedulers, traffic buffers, etc. (block 622), to determine whether operating in the unlicensed band is warranted without a clean channel being available (decision 624). For example, if there is not enough traffic to support a secondary carrier in the unlicensed band ('no' at decision 624), the corresponding Scell that supports it may be disabled (state 626). Conversely, if there is a substantial amount of traffic ('yes' at decision 624), even though a clean channel is not available, an Scell may nevertheless be enabled via one or more of the remaining carriers and CSAT operation in accordance with a CSAT communication scheme may be invoked (block 630) to mitigate the potential impact on co-existence.

Returning to FIG. 6, the Scell may be initially enabled in a deconfigured state (state 628). The Scell along with one or more corresponding user devices may then be configured and activated (block 630) for normal operation. In LTE, for example, an associated UE may be configured and deconfigured via corresponding Radio Resource Control (RRC) Config/Deconfig messages to add the Scell to its active set. Activation and deactivation of the associated UE may be performed, for example, by using Medium Access Control (MAC) Control Element (CE) Activation/Deactivation commands. At a later time, when the traffic level drops below a threshold, for example, an RRC Deconfig message may be used to remove the Scell from the UE's active set, and return the system to the deconfigured state (state 628). If all UEs are deconfigured, OSDL may be invoked to turn the Scell off.

During Carrier Sense Adaptive Transmission (CSAT) operation (block 630), the Scell may remain configured but be cycled between periods of activated operation (state 632) and periods of deactivated operation (state 634) in accordance with a (long-term) Time Division Multiplexed (TDM) communication pattern. In the configured/activated state (state 632), the Scell may operate at relatively high power (e.g., full powered ON state). In the configured/deactivated state (state 634), the Scell may operate at a reduced, relatively low power (e.g., depowered OFF state). As shown in FIG. 6 and as will be discussed in more detail below, CSAT cycling operation may be controlled by the classification manager 112 and/or the classification manager 122, for example, in accordance with one or more associated parameters of a classification parameter(s) database 636.

Figure 7:
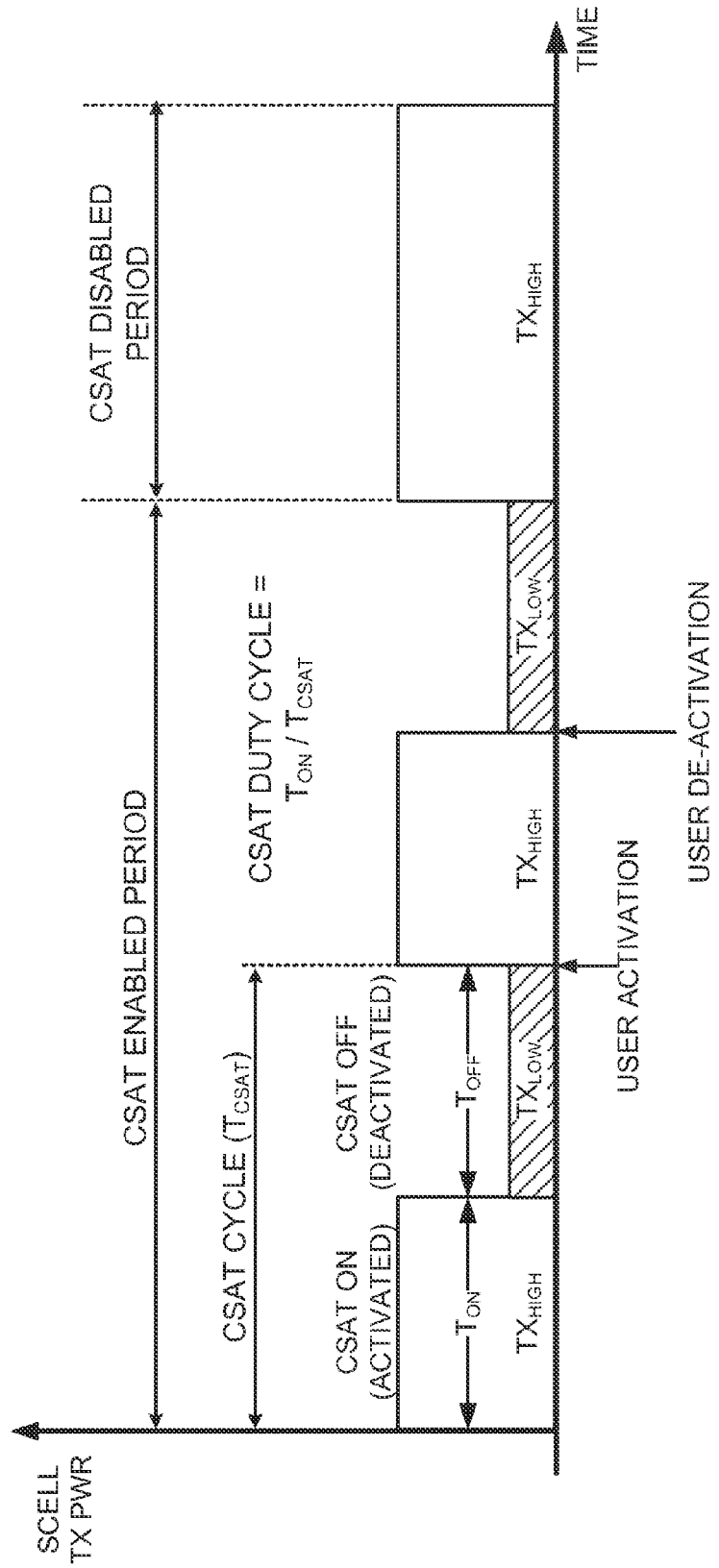
FIG. 7 illustrates in more detail certain aspects of a Carrier Sense Adaptive Transmission (CSAT) communication scheme for cycling cellular operation in accordance with a long-term Time Division Multiplexed (TDM) communication pattern.

FIG. 7 illustrates in more detail certain aspects of a CSAT communication scheme for cycling cellular operation in accordance with a long-term TDM communication pattern, according to one example. In FIG. 7, the CSAT communication scheme is shown across SCell transmission power (TX PWR) and time. As discussed above in relation to FIG. 6, CSAT may be selectively enabled on one or more Scells as appropriate to facilitate co-existence in unlicensed spectrum, even when a clean channel free of competing RAT operation is not available on the medium of interest.

When enabled, Scell operation is cycled between CSAT ON (activated) periods and CSAT OFF (deactivated) periods within a given CSAT cycle ($T_{CSAT}$). As shown in FIG. 7, each CSAT cycle is composed of one CSAT ON (activated) period and one CSAT OFF (deactivated) period. One or more associated user devices may be similarly cycled between corresponding Medium Access Control (MAC) activated and MAC deactivated periods. During an associated activated period of time $T_{ON}$, Scell transmission on the unlicensed band may proceed at a normal, relatively high transmission power. During an associated deactivated period of time $T_{OFF}$, however, the Scell remains in a configured state but transmission on the unlicensed band is reduced or even fully disabled to yield the medium (e.g., one or more channels across one or more carriers) to a competing RAT (as well as to perform various measurements via a co-located radio of the competing RAT).

Each of the associated CSAT parameters, including, for example, the CSAT pattern duty cycle (i.e., $T_{ON}/T_{CSAT}$) and the respective transmission powers during activated/deactivated periods, may be adapted based on the current signaling conditions to optimize CSAT operation in accordance with the CSAT communication scheme. As an example, if the utilization of a given medium by Wi-Fi devices is high (e.g., above a threshold), an LTE radio may adjust one or more of the CSAT parameters such that usage of the medium by the LTE radio is reduced. For example, the LTE radio may reduce its transmit duty cycle or transmit power on the medium. Conversely, if utilization of a given medium by Wi-Fi devices is low (e.g., below a threshold), an LTE radio may adjust one or more of the CSAT parameters such that usage of the medium by the LTE radio is increased. For example, the LTE radio may increase its transmit duty cycle or transmit power on the medium. In either case, the CSAT ON (activated) periods may be made sufficiently long to provide user devices with a sufficient opportunity to perform at least one measurement during each CSAT ON (activated) period.

A CSAT scheme as provided herein may offer several advantages for mixed RAT co-existence, particularly in unlicensed spectrum. For example, by adapting communication based on signals associated with a first RAT (e.g., Wi-Fi), a second RAT (e.g., LTE) may react to utilization of a shared medium by devices that use the first RAT while refraining from reacting to extraneous interference by other devices (e.g., non-Wi-Fi devices) or adjacent channels. As another example, a CSAT scheme can enable a device that uses one RAT to control how much protection is to be afforded to shared medium (e.g., co-channel) communications by devices that use another RAT by adjusting the particular parameters employed. In addition, such a scheme may be generally implemented without changes to the underlying RAT communication protocol. In an LTE system, for example, CSAT may be generally implemented without changing the LTE Physical (PHY) or MAC layer protocols, but by simply changing the LTE software.

To improve overall system efficiency, the CSAT cycle may be synchronized, in whole or in part, across different small cells, at least within a given operator. For example, the operator may set a minimum CSAT ON (activated) period ($T_{ON,min}$) and a minimum CSAT OFF (deactivated) period ($T_{OFF,min}$). Accordingly, in one example, the CSAT ON (activated) period durations and transmission powers may be different, but minimum deactivation times and certain measurement gaps may be synchronized.

In general, the extent to which certain shared operating spectrum on the unlicensed band is being utilized by another RAT such as Wi-Fi may be characterized in different ways, based on different inter-RAT measurements and other considerations. An example of an algorithm for conducting measurements on a medium (e.g., the medium 140 described above with reference to FIG. 1) and classifying utilization of that medium follows.

Measurement information may be obtained directly or indirectly from received signaling (e.g., via the signaling reception module 113 and/or the signaling reception module 123). To better associate the received signaling with the particular native RAT of interest and distinguish it from still other-RAT signaling as well as noise, a particular transceiver operating in accordance with the RAT of interest may be used to receive the signals and decode the packets associated therewith (rather than a generic transceiver that merely scans for aggregate background signal energy). The term "transceiver" as used herein may refer to different types of transmission and/or reception components, and is not intended to imply that such components are necessarily capable of both transmission and reception. As discussed above, such a transceiver may include a fully-functioning transmission/reception radio or a lower functionality receiver circuit, and may be co-located with another transceiver operating in accordance with another RAT.

As an example, for a shared Wi-Fi medium, a co-located Wi-Fi radio (such as the Wi-Fi radio 402 shown in FIG. 4) may sniff the medium for Wi-Fi packets. Wi-Fi packets may be detected by decoding one or more Wi-Fi signatures. Examples of such signatures include Wi-Fi preambles, Wi-Fi PHY headers, Wi-Fi MAC headers, Wi-Fi beacons, Wi-Fi probe requests, Wi-Fi probe responses, and so on.

A medium utilization metric for a particular (first) RAT of interest ($MU_{RAT1}$) may be calculated from one or more medium-usage characteristics (U) associated with the detected packets (e.g., via the utilization identification module 114 and/or the utilization identification module 124). As an example, the medium utilization metric may be calculated as a function of the number of detected packets, such that:

$$MU_{RAT1} = \Sigma U_i = \Sigma_i 1 = |\{i\}|$$ (Eq. 1)

Here, $i \in \psi$, where $\psi$ is the set of detected packets of the first RAT, and |.| is the size of the set. As another example, the medium utilization metric may be calculated as a function of the duration D of each detected packet, such that:

$$MU_{RAT1} = \Sigma U_i = \Sigma D_i / T_M$$ (Eq. 2)

Here, $T_M$ is a normalization factor based on the length of the measurement or observation period (e.g., the $T_{OFF}$ duration for a CSAT OFF (deactivated) period in which measurements are performed). Other medium-usage characteristics may be used in other examples to determine a base utilization amount associated with the first RAT.

As a further enhancement to account for different classes of medium utilization among the detected packets, a packet-specific weighting factor $W_i$ may be applied to the medium-usage characteristic $U_i$ of each detected packet i (e.g., via the classification module 115 and/or the classification module 125), such that:

$$MU_{RAT1} = \Sigma U_i \cdot W_i$$ (Eq. 3)

The packet-specific weighting factor $W_i$ may be derived from one or more attributes ($A_1, A_2, \ldots, A_n$) associated with the corresponding packet i (denoted as $A_{1i}, A_{2i}, \ldots, A_{ni}$). Returning to the Wi-Fi example above, example attributes that may be used to set the packet-specific weighting factor $W_i$ may include signal strength or energy (e.g., RSSI), modulation and coding scheme (MCS) or packet format used by the packet, protocol revision of the packet (e.g., 802.11a vs. 802.11n vs. 802.11ac), packet type (e.g., data vs. control, such as Acknowledgement (ACK) packets, Block ACK packets, Clear to Send (CTS) packets, Request to Send (RTS) packets, etc.), traffic type (e.g., high vs. low QoS), Wi-Fi channel type (e.g., primary vs. secondary), the bandwidth used to transmit the packet, and other attributes of the packets related to different classifications of Wi-Fi signaling. Similar attributes may be used for other RATs as desired.

In general, the packet-specific weighting factor $W_i$ may be a function of one or a combination of such attributes.

FIG. 8 illustrates a single attribute classification scheme, in which the packet-specific weighting factor $W_i$ maps to different values ($w_j$) based on the value of the attribute employed. In this example, the attribute is discretized into four bins with corresponding values $W_0$ to $W_3$. As discussed in more detail below, the number of bins may vary as desired, up to and including an infinite number representing a continual function.

FIG. 9 illustrates a double attribute classification scheme, in which the packet-specific weighting factor $W_i$ maps to different values ($w_{j,k}$) based on the combination of values of the attributes employed. In this example, the attributes are discretized into four bins each (for a total of sixteen bins) with corresponding values $w_{00}$ to $w_{33}$. As discussed in more detail below, the number of bins may vary as desired, up to and including an infinite number representing a continual function.

It will be appreciated that the number of attributes shown in FIGS. 8 and 9 are selected for illustration purposes only, and that the number of attributes employed may be expanded as desired.

As a particular example, the packet-specific weighting factor $W_i$ may be derived from the RSSI of the packet to account for different signaling strengths among the detected packets. Different signaling strengths may disparately impact the effect of co-existence on the shared medium. Thus, by increasing the weight of stronger Wi-Fi packets, for example, which may indicate a closer proximity of Wi-Fi devices than weaker Wi-Fi packets, the packet-specific weighting factor $W_i$ may be used to correct the base utilization value $U_i$ in terms of the medium utilization metric $MU_{RAT1}$ calculation to more accurately reflect the impact or need to protect the Wi-Fi medium utilization.

In other examples, the packet-specific weighting factor $W_i$ may be derived from packet type to distinguish between control and traffic signaling. For example, a higher weight may be given to ACK, Block ACK, or CTS packets, which are typically sent by a Wi-Fi receiver in response to receiving a data packet or an Request to Send (RTS) packet. It may be important to protect the Wi-Fi receiver in this instance because a corruption of such control signaling may require retransmission not just of the corrupted signal itself but also other corresponding data, making control signaling disproportionately more impactful on medium utilization than its relatively short duration. Thus, the packet-specific weighting factor $W_i$ may be a function of the RSSI of the packet as well as whether it is a data packet or an ACK/BlockACK/CTS packet, with a higher weight being given for higher RSSI and packets received from Wi-Fi receiver nodes in response to Wi-Fi transmitter activity. This helps to address the so-called "hidden node" problem.

In still other examples, the packet-specific weighting factor $W_i$ may be a function of attributes of not only the packet itself but also other packets (e.g., attributes of two successive detected packets). For example, reception of a data packet followed by a corresponding ACK or Block ACK packet during a detection period may be taken as an indication that there is a Wi-Fi transmitter and corresponding Wi-Fi receiver pair operating on the medium (although one may be hidden). In this case, a joint attribute for both packets may be derived and used to capture the characteristics of the corresponding Wi-Fi link (i.e., between the transmitter and receiver pair) as a whole. For example, the weight may be derived jointly based on attributes of a data and an ACK packet. The weight may be a function of the data packet RSSI, the ACK packet RSSI, and the MCS used in the data packet (or the MCS used in the ACK packet, which may be related). A joint weight instead of separate weights may then be given to both the data packet and the ACK packet, reflecting the corresponding Wi-Fi link. This also helps to address the hidden node problem, in that while considering Wi-Fi packets individually may give an indication of the proximity of a given Wi-Fi device, it may not provide information about its corresponding communication partner if that entity is hidden. By capturing packets from Wi-Fi device pairs (e.g., through data and corresponding ACK packets), the Wi-Fi link as a whole may be better characterized and therefore better protected.

In still other examples, the packet-specific weighting factor $W_i$ may be derived from traffic type to distinguish between high and low Quality of Service (QoS) traffic, and so on.

In general, the packet-specific weighting factor $W_i$ may be used to decrease the importance afforded to a given attribute (e.g., with a value of $W_i$ less than 1) or to increase the importance afforded to a given attribute (e.g., with a value of $W_i$ greater than 1), although it will be appreciated that the particular numerical weighting scheme employed may be different for different applications and that several mathematical variants may be used to obtain equivalent results. In the extreme, the packet-specific weighting factor $W_i$ may be set to 1 for all detected packets, effectively weighting them equally (e.g., for computational simplicity). In the other extreme, a binary weighting scheme may be employed based on a threshold, where packets falling on one side of the threshold may be considered in full (e.g., by setting $W_i=1$) while packets falling on the other side of the threshold may not be factored in at all (e.g., by setting $W_i=0$). For example, where the packet-specific weighting factor $W_i$ is derived from the RSSI of the packet, packets that have an RSSI less than a corresponding $RSSI_{threshold}$ (e.g., $-62$ dBm) may be effectively filtered out of the medium utilization metric $MU_{RAT1}$ calculation by setting $W_i=0$. Here, the total medium utilization calculation may be reduced down to a summation over the durations of the packets associated with an RSSI above the $RSSI_{threshold}$.

In general, however, any number N of thresholds may be employed as desired, ranging from N=0 (e.g., as in the unitary example above where $W_i$ may be set to 1 for all detected packets), to N=1 (e.g., as in the binary example above where $W_i$ may be set to 0 or 1 for packets on either side of a single threshold), to N=2 or more for a plurality of discrete or even continuous (N=∞) threshold values (which may accordingly be expressed as a transfer function, e.g., $W_i=F(A_{1i}, A_{2i}, \ldots, A_{ni})$).

Returning to FIGS. 8 and 9, three example threshold values $T_0$ to $T_2$ for illustration purposes are shown for each attribute, with packets having attribute values falling into the different classes defined by the threshold values being assigned different weighting factor $W_i$ values. As an example, continuing with the scenario above where the packet-specific weighting factor $W_i$ is derived from the RSSI of the packet (e.g., in a single-attribute classification scheme such as FIG. 8), the three threshold values may be used to define four classes or categories of medium utilization and thereby distinguish between nominal (e.g., below $T_0=-82$ dBm), low (e.g., between $T_0=-82$ dBm and $T_1=-72$ dBm), medium (e.g., between $T_1=-72$ dBm and $T_2=-62$ dBm), and high (e.g., above $T_2=-62$ dBm) signal strength levels. Packets with RSSI values falling into these different classes may be assigned different weighting factor $W_i$ values, such as $W_i=w_0$ (e.g., 0) for nominal signal strength packets, $W_i=w_1$ (e.g., 0.3) for low signal strength packets, $W_i=w_2$ (e.g., 0.7) for medium signal strength packets, and $W_i=w_3$ (e.g., 1) for high signal strength packets.

In the example above, the weighting factor $W_i$ values may also reflect packet type in addition to RSSI (e.g., in a double-attribute classification scheme such as FIG. 9), such that packets identified as control packets may be weighted more heavily than ordinary data packets, even when falling into the same class based on RSSI. For example, a multiplier greater than 1 (e.g., 2, 5, 10, 20, 30, etc.) may be applied to the weighting factor $W_i$ values for any detected ACK, Block ACK, or CTS packets to balance protecting these packets with their typically shorter durations (which may be only on the order of tens of μs as compared to a few ms for data packets). Adding such a multiplier to the weighting factor $W_i$ may be used to compensate for the duration discrepancies, thereby equalizing, for example, the total duration factored into the medium utilization metric $MU_{RAT1}$. A similar mathematical variant is to replace the duration of such short packets by a duration of a virtual data packet, then multiply by a weighting factor $W_i$ from 0 to 1 based on the RSSI attribute or other attributes.

The number and value of the thresholds and corresponding weights may be determined in a variety of ways to optimize the effective medium utilization calculations. As an example, the thresholds and corresponding weights may be predetermined based on simulation data. As another example, the thresholds and corresponding weights may be dynamically determined based on current or historical data for the specific operating environment. Current or historical Wi-Fi activity that may be used for Wi-Fi co-existence scenarios include the amount of traffic detected at each RSSI level (e.g., over a sliding window time scale), based on measurements from a co-located Wi-Fi radio or other Wi-Fi devices in the neighborhood (e.g., one or more STAs served by the co-located Wi-Fi radio or one or more neighboring APs, connected via backhaul signaling, over-the-air signaling, or connected indirectly for information sharing purposes via the one or more STAs). Heavy traffic detected historically for a given RSSI level, for example, may cause a higher corresponding weight to be used to prioritize protection of the Wi-Fi devices associated with that signaling. Similarly, the number of thresholds may be increased or decreased to control the granularity of the signaling activity classes (e.g., isolating or grouping together different classes), and the threshold levels may be set accordingly to ensure accurate classifications.

It will be appreciated that the packet-specific weighting factor $W_i$ may be applied in the medium utilization calculation in a variety of ways, including deterministic weighting (as described predominantly above) as well as conditional or probabilistic summations. For example, instead of calculating the medium utilization metric $MU_{RAT1}$ from each detected packet i deterministically by applying the packet-specific weighting factor $W_i$ directly to the base utilization value $U_i$, the medium utilization metric $MU_{RAT1}$ may be calculated probabilistically such that:

$$MU_{RAT1} = \Sigma\{U_i, \text{ with probability } W_i, \text{ or } 0, \text{ with probability}(1-W_i)\} \quad \text{(Eq. 4)}$$

Thus, if a packet is received with an RSSI value x, it can be added to the medium utilization calculation with probability p(x), where x and p(x) may follow a similar example to what is described above. Over time or a large number of samples, the deterministic and probabilistic approaches will tend to converge.

In some designs, it may be advantageous to average or otherwise filter the medium utilization metric $MU_{RAT1}$ across multiple measurement periods (e.g., across multiple CSAT OFF periods). Example filtering methods include a moving window average with a time constant of a desired length (where non-measurement periods are excluded), infinite impulse response (IIR) filtering, etc.

The medium utilization metric $MU_{RAT1}$ may be used for various communication adaptation calculations (e.g., via the communication adaptation module 116 and/or the communication adaptation module 126), several of which are described in more detail below.

Returning to FIG. 7, one or more CSAT cycling parameters, for example, may be adapted based on the medium utilization metric $MU_{RAT1}$. As discussed in more detail above, the CSAT cycling parameters may include or otherwise correspond to a duty cycle, a transmit power (e.g., the transmit power during a CSAT ON (activated) period, the transmit power during a CSAT OFF (deactivated) period, or a combination thereof), cycle timing (e.g., the start/stop time of each CSAT cycle), and so on. Each parameter may be bounded by corresponding max (e.g., $T_{OFF,max}$) and min (e.g., $T_{OFF,min}$) values as appropriate for a given system, and modifications to the cycling parameters may be constrained by a hysteresis parameter (H) to limit undue state oscillations.

As an example, the CSAT OFF (deactivated) period may be increased by a step $\Delta T$ (up to, at most, a specified maximum) if the medium utilization metric $MU_{RAT1}$ exceeds a threshold utilization $TH_{UTIL}$ value, or decreased by a step $\Delta T$ (down to, at most, a specified minimum) if the utilization of the medium $MU_{RAT1}$ falls below a threshold utilization $TH_{UTIL}$ value.

An example algorithm is as follows:

CSAT OFF=min($T_{OFF,max}$; CSAT OFF+$\Delta T$) if
$MU_{RAT1}$>$TH_{UTIL}$, CSAT OFF=max($T_{OFF,min}$;
CSAT OFF−$\Delta T$) if $MU_{RAT1}$<$TH_{UTIL}$−H, else
CSAT OFF=CSAT OFF    (Eq. 5)

Accordingly, it will be appreciated that any of the above parameters, or more generally, any transmission attribute, may be set or adjusted to control how a medium is utilized by competing RATs, based on how much protection is to be provided for one of the RATs. For example, the threshold utilization $TH_{UTIL}$ value may be determined in a variety of ways to optimize the tradeoff between LTE performance and Wi-Fi co-existence, and in accordance with various system or application-specific parameters or requirements. Current or historical LTE activity may also be used to set one or more of the above parameters, including traffic loading of the LTE node, the corresponding QoS covered, and so on.

In addition to CSAT cycling parameter adaptation, the medium utilization metric $MU_{RAT1}$ as determined in accordance with the techniques herein may also be applied to other co-existence schemes. For example, a similar approach may be applied to a Listen Before Talk (LBT) mechanism where the medium utilization metric $MU_{RAT1}$ may be used as a probabilistic backoff factor. In this way, rather than triggering a deterministic backoff at a set energy level threshold (E), for example, the backoff may be probabilistically triggered at a first energy level threshold ($E_1$) with a first probability ($P_1$), at a second energy level threshold ($E_2$) with a second probability ($P_2$), and so on, where the different probabilities as well as the different energy level thresholds may be set based on the medium utilization metric $MU_{RAT1}$. It will be appreciated that when detection of a single packet is sufficient to trigger an LBT procedure, $MU_{RAT1}$ may reduce down to U·W, or simply W when the base utilization U is equal to the number of packets detected (i.e., U=1). The weighting factor W may therefore be used as or to otherwise set a probabilistic backoff factor, as well as other LBT parameters (e.g., Carrier Sense Multiple Access (CSMA) parameters such as contention backoff window size, etc.).

Figure 10:
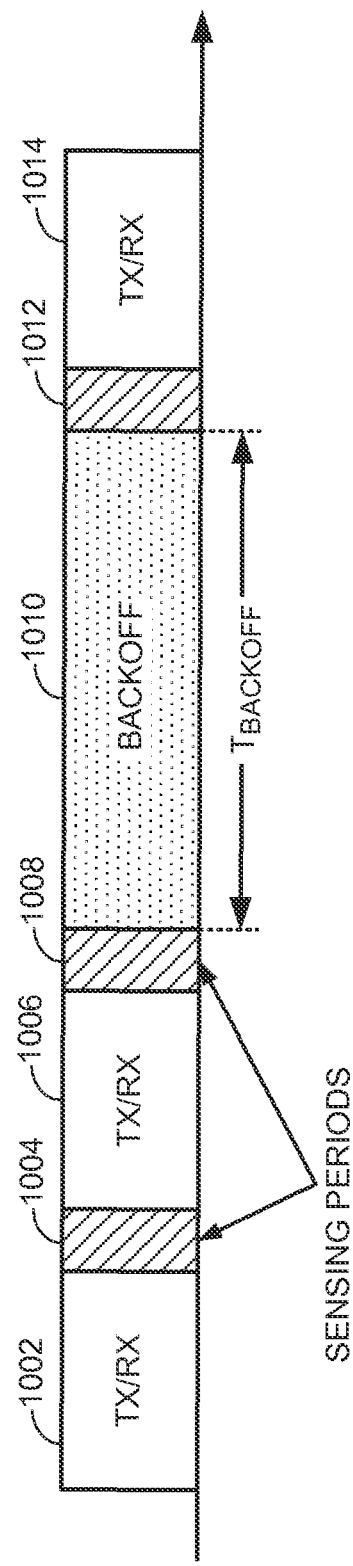
FIG. 10 illustrates an example Listen Before Talk (LBT) transmission scheme in a shared spectrum environment.

FIG. 10 illustrates an example LBT transmission scheme in a shared spectrum environment, such as the environment illustrated in FIG. 1. In LBT, between transmission/reception (TX/RX) time periods (e.g., between UL and DL frames), a sensing interval is provided to allow devices (e.g., operating in accordance with LTE) to determine if other devices (e.g., operating in accordance with Wi-Fi) are transmitting on the shared medium before initiating transmission of their own.

In this example, after a first TX/RX period 1002, sensing is performed during a first sensing interval 1004. No packets from other devices are detected during the first sensing interval 1004, and the device therefore commences a second TX/RX period 1006, following which sensing is again performed in a second sensing interval 1008. In this instance, packets are detected from other devices and the device refrains from transmitting for a given backoff period 1010 (e.g., for a standard frame duration or in accordance with some other a backoff timer). Following the backoff period 1010 and another sensing period 1012 where no activity is detected, the device proceeds with another TX/RX period 1014.

In conventional LBT, the sensing operation is a binary decision based on a corresponding threshold, such that Wi-Fi packets with an RSSI above an $RSSI_{threshold}$ (e.g., −62 dBm), for example, trigger the backoff period, while Wi-Fi packets with an RSSI below the $RSSI_{threshold}$ do not. For reasons similar to those discussed above for CSAT cycling parameter adaptation, the LBT backoff decision may be enhanced in accordance with the techniques described herein by providing a plurality of N thresholds to define different classes or categories of medium utilization. The number N of thresholds may be employed as desired, ranging from a plurality of discrete (N=2 or more) up to a continuous number (N=∞) of threshold values (which may accordingly be expressed as a transfer function). In this way, rather than a binary backoff trigger, a probabilistic backoff trigger may be defined based on the different classes of medium utilization, providing more flexibility in the tradeoff between LTE performance and Wi-Fi co-existence, for example.

As an example, three threshold values $T_0$ to $T_2$ may again be used to define four classes or categories of medium utilization and thereby distinguish between nominal (e.g., below $T_0$=−82 dBm), low (e.g., between $T_0$=−82 dBm and $T_1$=−72 dBm), medium (e.g., between $T_1$=−72 dBm and $T_2$=−62 dBm), and high (e.g., above $T_2$=−62 dBm) signal strength levels. For LBT, packets with RSSI values falling into these different classes, for example, may be assigned different backoff probability P values, such as P=$p_0$ (e.g., 0) for nominal signal strength packets, P=$p_1$ (e.g., 0.3) for low signal strength packets, P=$p_2$ (e.g., 0.7) for medium signal strength packets, and P=$p_3$ (e.g., 1) for high signal strength packets. Thus, an LTE device may back off with probability $p_3$ if it detects an energy at or above −62 dBm, back off with probability $p_2$ if the detected energy is between −62 dBm and −72 dBm, and back off with probability $p_1$ if the energy detected is between −82 dBm and −72 dBm. Otherwise, if the energy detected is below −82 dBm, the device may communicate normally. In multi-attribute designs, the probability values here may also be modified to reflect packet type, for example, such that packets identified as control packets may be weighted more heavily than ordinary data packets, even when falling into the same class based on RSSI.

As described in more detail above, the number and value of the thresholds and corresponding probabilities may be determined in a variety of ways to optimize the tradeoff between LTE performance and Wi-Fi co-existence, for example, and in accordance with various system or application-specific parameters or requirements. As an example, the thresholds and corresponding probabilities may be predetermined based on simulation data, or dynamically determined based on current or historical data for the specific operating environment. Current or historical Wi-Fi activity may also be used, such as the amount of traffic detected at each RSSI level (e.g., over a sliding window time scale), as well as current or historical LTE activity, including traffic loading of the LTE node, the corresponding QoS covered, and so on.

Figure 11:
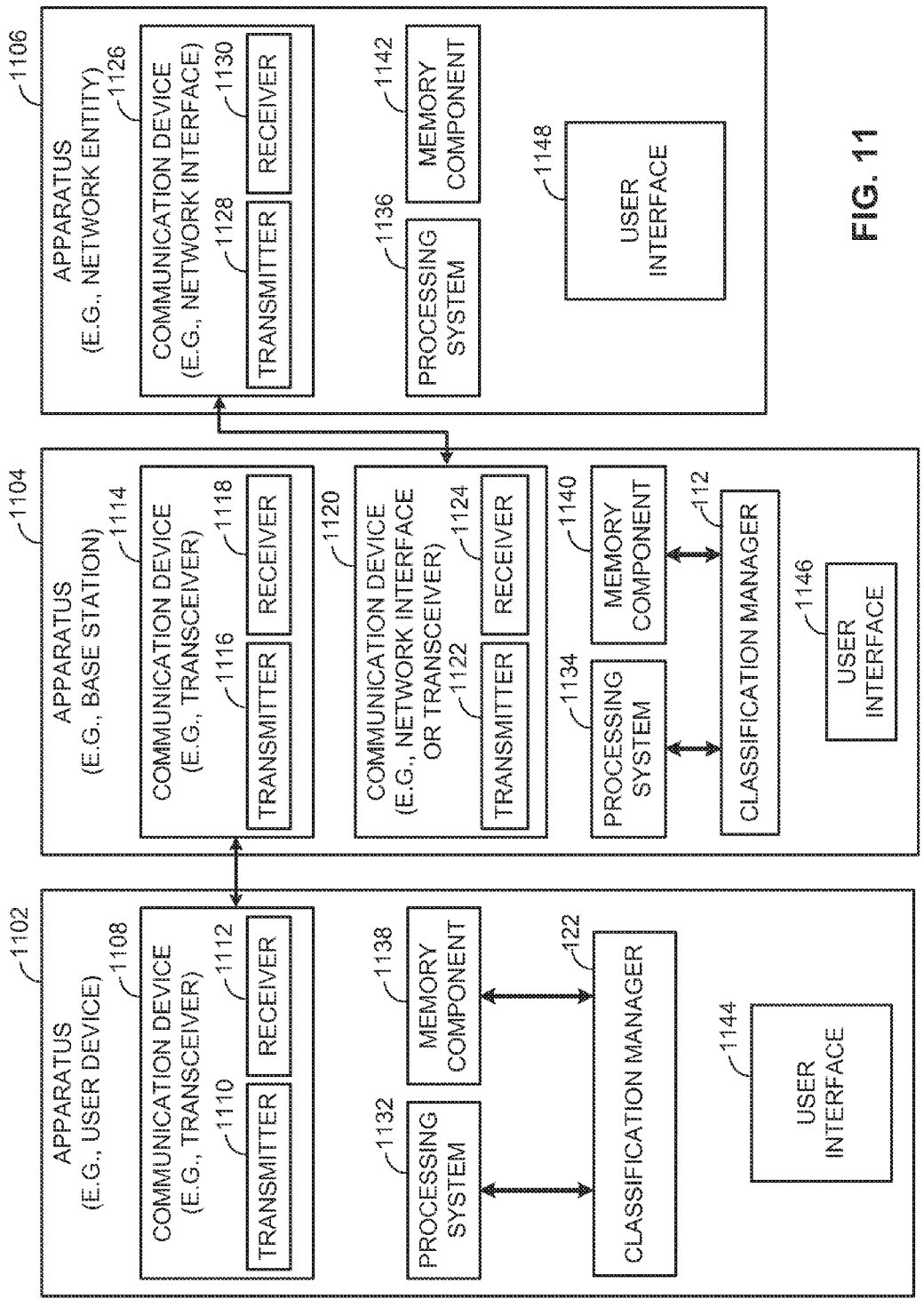
FIG. 11 is a block diagram of several sample aspects of components that may be employed in communication nodes and configured to support communication as taught herein according to one example.

FIG. 11 illustrates several sample components (represented by corresponding blocks) that may be incorporated into an apparatus 1102, an apparatus 1104, and an apparatus 1106 (corresponding to, for example, a user device, a base station, and a network entity, respectively) to support the medium utilization classification operations disclosed herein. It will be appreciated that these components may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 1102 and the apparatus 1104 each include at least one wireless communication device (represented by the communication devices 1108 and 1114 (and the communication device 1120 if the apparatus 1104 is a relay)) for communicating with other nodes via at least one designated RAT. Each communication device 1108 includes at least one transmitter (represented by the transmitter 1110) for transmitting and encoding signals (e.g., messages, indications, information, and so on) and at least one receiver (represented by the receiver 1112) for receiving and decoding signals (e.g., messages, indications, information, pilots, and so on). Similarly, each communication device 1114 includes at least one transmitter (represented by the transmitter 1116) for transmitting signals (e.g., messages, indications, information, pilots, and so on) and at least one receiver (represented by the receiver 1118) for receiving signals (e.g., messages, indications, information, and so on). If the apparatus 1104 is a relay station, each communication device 1120 may include at least one transmitter (represented by the transmitter 1122) for transmitting signals (e.g., messages, indications, information, pilots, and so on) and at least one receiver (represented by the receiver 1124) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 1104 may also comprise a Network Listen Module (NLM) or the like for performing various measurements.

The apparatus 1106 (and the apparatus 1104 if it is not a relay station) includes at least one communication device (represented by the communication device 1126 and, optionally, 1120) for communicating with other nodes. For example, the communication device 1126 may comprise a network interface that is configured to communicate with one or more network entities via a wire-based or wireless backhaul. In some aspects, the communication device 1126 may be implemented as a transceiver configured to support wire-based or wireless signal communication. This communication may involve, for example, sending and receiving: messages, parameters, or other types of information. Accordingly, in the example of FIG. 11, the communication device 1126 is shown as comprising a transmitter 1128 and a receiver 1130. Similarly, if the apparatus 1104 is not a relay station, the communication device 1120 may comprise a network interface that is configured to communicate with one or more network entities via a wire-based or wireless backhaul. As with the communication device 1126, the communication device 1120 is shown as comprising a transmitter 1122 and a receiver 1124.

The apparatuses 1102, 1104, and 1106 also include other components that may be used in conjunction with the medium utilization classification operations as taught herein. The apparatus 1102 includes a processing system 1132 for providing functionality relating to, for example, user device operations to support medium utilization classification as taught herein and for providing other processing functionality. The processing system 1132 may operate in conjunction with the classification manager 122 to provide or otherwise support the medium utilization classification discussed herein. The apparatus 1104 includes a processing system 1134 for providing functionality relating to, for example, base station operations to support medium utilization classification as taught herein and for providing other processing functionality. The processing system 1134 may operate in conjunction with the classification manager 112 to provide or otherwise support the medium utilization classification discussed herein. The apparatus 1106 includes a processing system 1136 for providing functionality relating to, for example, network operations to support medium utilization classification as taught herein and for providing other processing functionality. The apparatuses 1102, 1104, and 1106 include memory components 1138, 1140, and 1142 (e.g., each including a memory device), respectively, for maintaining information (e.g., information indicative of reserved resources, thresholds, parameters, and so on). In addition, the apparatuses 1102, 1104, and 1106 include user interface device processing systems 1144, 1146, and 1148, respectively, for providing indications (e.g., audible and/or visual indications) to a user and/or for receiving user input (e.g., upon user actuation of a sensing device such a keypad, a touch screen, a microphone, and so on).

For convenience, the apparatuses 1102, 1104, and/or 1106 are shown in FIG. 11 as including various components that may be configured according to the various examples described herein. It will be appreciated, however, that the illustrated blocks may have different functionality in different designs.

The components of FIG. 11 may be implemented in various ways. In some implementations, the components of FIG. 11 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1108, 1132, 1138, and 1144 may be implemented by processor and memory component(s) of the apparatus 1102 (e.g., by execution of appropriate code and/or by appropriate configuration of processor components). Similarly, some or all of the functionality represented by blocks 1114, 1120, 1134, 1140, and 1146 may be implemented by processor and memory component(s) of the apparatus 1104 (e.g., by execution of appropriate code and/or by appropriate configuration of processor components). Also, some or all of the functionality represented by blocks 1126, 1136, 1142, and 1148 may be implemented by processor and memory component(s) of the apparatus 1106 (e.g., by execution of appropriate code and/or by appropriate configuration of processor components).

Figure 12:
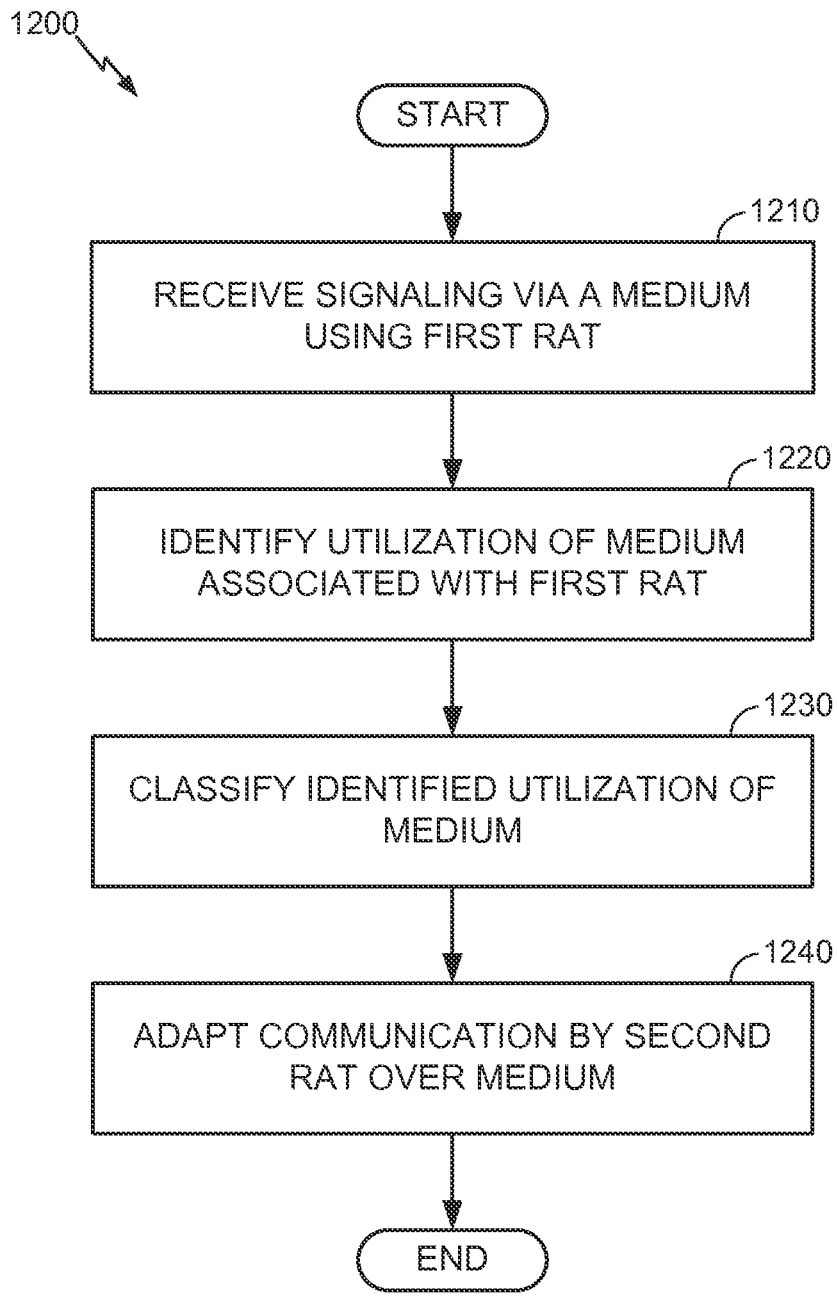
FIG. 12 is a flow diagram illustrating an example method of communication for interference management between RATs sharing operating spectrum in an unlicensed band of radio frequencies.

FIG. 12 is a flow diagram illustrating an example method of communication management between RATs sharing operating spectrum in an unlicensed band of radio frequencies. The method 1200 may be performed, for example, by a base station (e.g., the base station apparatus 1104 illustrated in FIG. 11) or by a user device (e.g., the user device apparatus 1102 illustrated in FIG. 11).

As shown, the method 1200 may include receiving signaling via a medium using a first (e.g., Wi-Fi technology) RAT (block 1210). With reference to FIG. 11, the receiving may be performed, for example, by a communication device such as the communication device 1108 or the communication device 1114. The medium may be an unlicensed radio frequency band shared by Wi-Fi and LTE devices, for example. Based on the received signaling, utilization of the medium (e.g., a baseline or fractional utilization) associated with the first RAT may be identified (block 1220). Utilization of the medium may give an indication of an amount of interference (e.g., co-channel interference). With reference again to FIG. 11, the identification may be performed, for example, by a processing system such as the processing system 1134 or the processing system 1144.

In response, the identified utilization of the medium may be classified (block 1230). With reference again to FIG. 11, the classification may be performed, for example, by a processing system such as the processing system 1134 or the processing system 1144. The classification may be based on an attribute (e.g., RSSI) associated with the received signaling and a plurality of thresholds associated with the attribute, wherein the plurality of thresholds define different classes of utilization. Based on the classified utilization of the medium, communication by a second RAT (e.g., LTE technology) over the medium may be adapted in various ways (block 1240). With reference again to FIG. 11, the adapting may be performed, for example, by a processing system such as the processing system 1134 or the processing system 1144.

As discussed in more detail above with reference, for example, to FIG. 4, the identifying the utilization of the medium may comprise decoding at least one of a preamble, a PHY header, a MAC header, a beacon, a probe request, a probe response, or a combination thereof. The identifying the utilization of the medium may also comprise determining at least one of a number of packets associated with the first RAT, a transmission duration for one or more packets associated with the first RAT, or a combination thereof. Further, the attribute may comprise, for example, at least one of a received signal strength associated with a packet of the first RAT, a packet type associated with a packet of the first RAT, a traffic type associated with a packet of the first RAT, a joint attribute associated with two related packets of the first RAT, or a combination thereof.

As also discussed in more detail above with reference, for example, to FIG. 8 and FIG. 9, the classifying may comprise, for example comparing the attribute to at least one of a first threshold or a second threshold among the plurality of thresholds. The first threshold may correspond to a lower value of the attribute and the second threshold may correspond to a higher value of the attribute. The identified utilization of the medium may be classified as a first class among the classes of utilization in response to the comparison indicating that the attribute is below the first threshold. The identified utilization of the medium may be classified as a second class among the classes of utilization in response to the comparison indicating that the attribute is between the first threshold and the second threshold. The identified utilization of the medium may be classified as a third class among the classes of utilization in response to the comparison indicating that the attribute is above the second threshold.

As an example, the identification of the utilization of the medium may comprise determining an RSSI for a packet associated with the first RAT, the first class corresponding to a low received signal strength classification, the second class corresponding to a medium received signal strength classification, and the third class corresponding to a high received signal strength classification. The low, medium, and high received signal strength classifications may be relative to each other with respect to corresponding values of the received signal strength.

For CSAT communication schemes, the adapting may comprise setting one or more cycling parameters of a TDM communication pattern defining activated and deactivated periods of transmission for the second RAT. Continuing with the example above, the one or more cycling parameters may be set differently for the first, second, and third classes. For an LBT communication scheme, the adapting may comprise setting a probability associated with an LBT backoff trigger. Continuing with the example above, the probability may be set differently for the first, second, and third classes.

In some designs, the classifying may comprise classifying the identified utilization of the medium based on first (e.g., RSSI) and second (e.g., packet type) attributes associated with the received signaling and first and second pluralities of thresholds associated with the first and second attributes, respectively, wherein the first and second pluralities of thresholds define the different classes of utilization. The different classes of utilization may include different classes for different combinations of first attribute and second attribute values.

Figure 13:
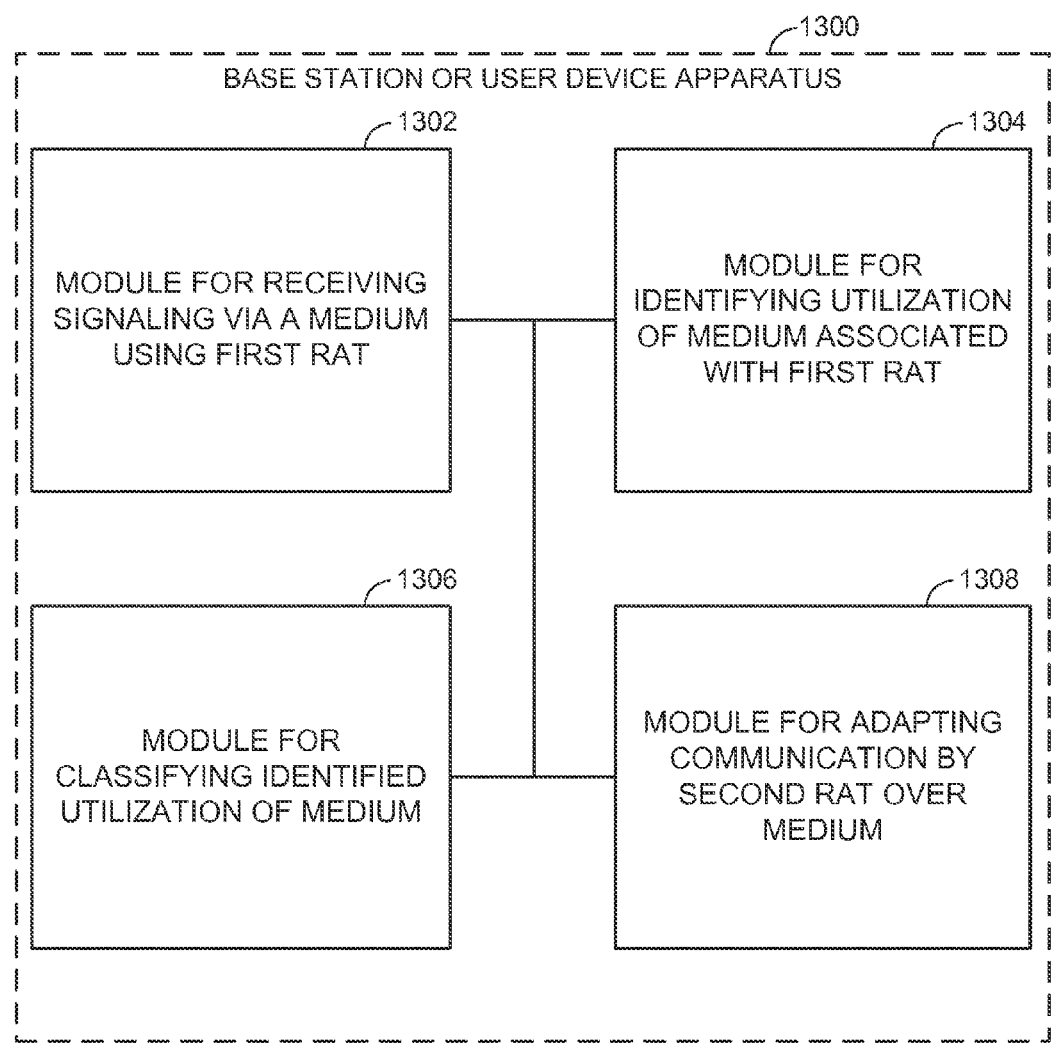
FIG. 13 is another block diagram of several sample aspects of apparatuses configured to support communication as taught herein.

FIG. 13 illustrates an example base station or user device apparatus 1300 represented as a series of interrelated functional modules. A module for receiving 1302 may correspond at least in some aspects to, for example, a communication device as discussed herein (e.g., the communication device 1108 or the communication device 1114). A module for identifying 1304 may correspond at least in some aspects to, for example, a processing system as discussed herein (e.g., the processing system 1134 or the processing system 1144). A module for classifying 1306 may correspond at least in some aspects to, for example, a processing system as discussed herein (e.g., the processing system 1134 or the processing system 1144). A module for adapting 1308 may correspond at least in some aspects to, for example, a processing system as discussed herein (e.g., the processing system 1134 or the processing system 1144).

The functionality of the modules of FIG. 13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13, as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein.

Figure 14:
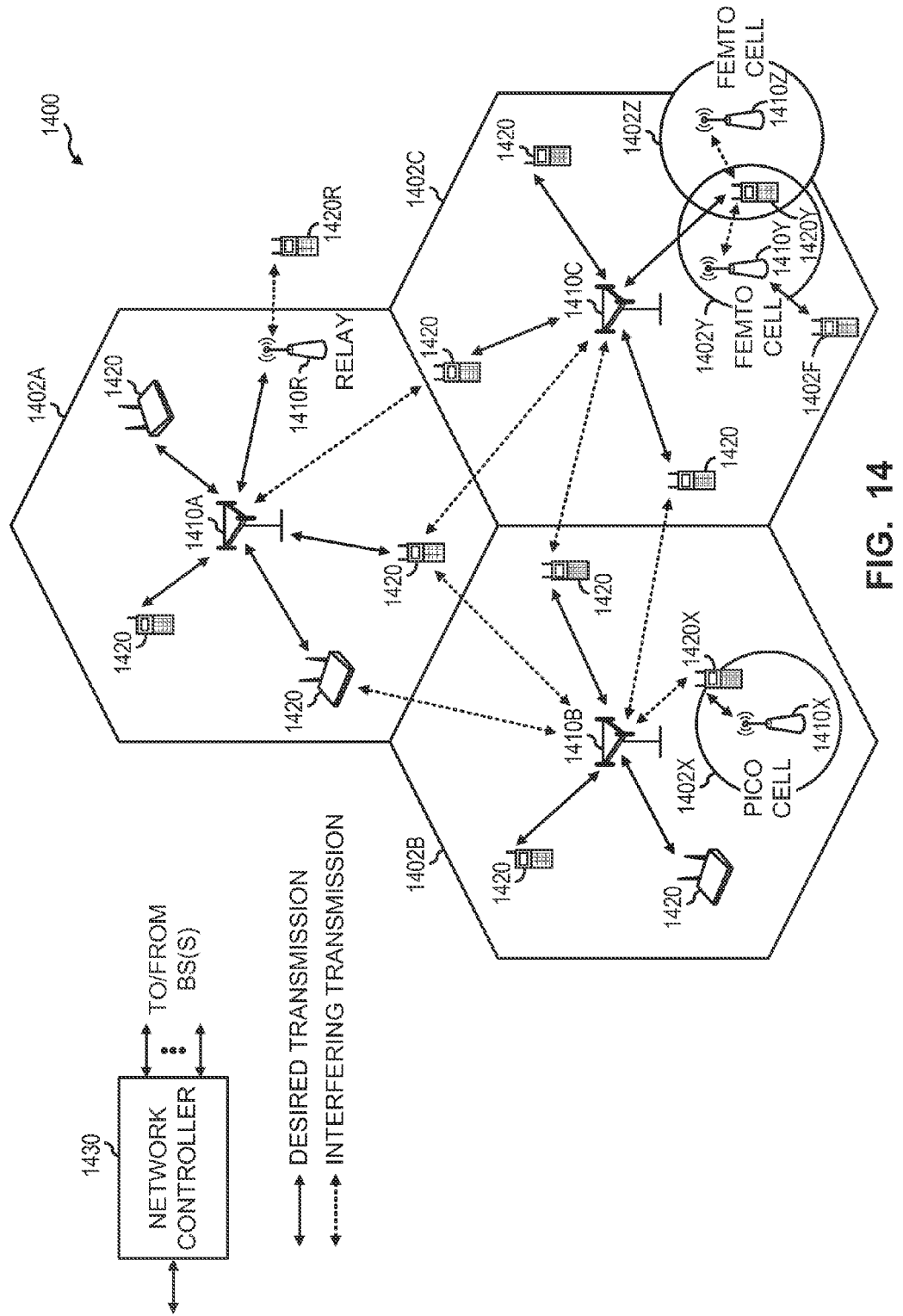
FIG. 14 illustrates an example communication system environment in which the teachings and structures herein may be incorporated.

FIG. 14 illustrates an example communication system environment in which the medium utilization classification teachings and structures herein may be incorporated. The wireless communication network 1400, which will be described at least in part as an LTE network for illustration purposes, includes a number of eNBs 1410 and other network entities. Each of the eNBs 1410 provides communication coverage for a particular geographic area, such as macro cell or small cell coverage areas.

In the illustrated example, the eNBs 1410A, 1410B, and 1410C are macro cell eNBs for the macro cells 1402A, 1402B, and 1402C, respectively. The macro cells 1402A, 1402B, and 1402C may cover a relatively large geographic area (e.g., several kilometers in radius) and may allow unrestricted access by UEs with service subscription. The eNB 1410X is a particular small cell eNB referred to as a pico cell eNB for the pico cell 1402X. The pico cell 1402X may cover a relatively small geographic area and may allow unrestricted access by UEs with service subscription. The eNBs 1410Y and 1410Z are particular small cells referred to as femto cell eNBs for the femto cells 1402Y and 1402Z, respectively. The femto cells 1402Y and 1402Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below. One or more of the small cell eNB 1410X, 1410Y, and 1410Z may be configured for medium utilization classification in accordance with the teachings herein.

The wireless communication network 1400 also includes a relay station 1410R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 14, the relay station 1410R communicates with the eNB 1410A and a UE 1420R in order to facilitate communication between the eNB 1410A and the UE 1420R. A relay station may also be referred to as a relay eNB, a relay, etc. The relay station 1410R may be configured for medium utilization classification in accordance with the teachings herein.

The wireless communication network 1400 is a heterogeneous network in that it includes eNBs of different types, including macro eNBs, pico eNBs, femto eNBs, relays, etc. As discussed in more detail above, these different types of eNBs may have different transmit power levels, different coverage areas, and different impacts on interference in the wireless communication network 1400. For example, macro eNBs may have a relatively high transmit power level whereas pico eNBs, femto eNBs, and relays may have a lower transmit power level (e.g., by a relative margin, such as a 10 dBm difference or more).

Returning to FIG. 14, the wireless communication network 1400 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 1430 may couple to a set of eNBs and provide coordination and control for these eNBs. The network controller 1430 may communicate with the eNBs 1410 via a backhaul. The eNBs 1410 may also communicate with one another, e.g., directly or indirectly via a wireless or wireline backhaul.

As shown, the UEs 1420 may be dispersed throughout the wireless communication network 1400, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 14, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 1420Y may be in proximity to femto eNBs 1410Y, 1410Z. Uplink transmissions from UE 1420Y may interfere with femto eNBs 1410Y, 1410Z. Uplink transmissions from UE 1420Y may jam femto eNBs 1410Y, 1410Z and degrade the quality of reception of other uplink signals to femto eNBs 1410Y, 1410Z. One or more of the UEs 1420 may be configured for medium utilization classification in accordance with the teachings herein.

Small cell eNBs such as the pico cell eNB 1410X and femto eNBs 1410Y, 1410Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto eNB 1410Y may be an open-access femto eNB with no restricted associations to UEs. The femto eNB 1410Z may be a higher transmission power eNB initially deployed to provide coverage to an area. Femto eNB 1410Z may be deployed to cover a large service area. Meanwhile, femto eNB 1410Y may be a lower transmission power eNB deployed later than femto eNB 1410Z to provide coverage for a hotspot area (e.g., a sports arena or stadium) for loading traffic from either or both eNB 1410C, eNB 1410Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Acces Memory (RAM), flash memory, Read-only Memory (ROM), Erasable Programmable Read-only Memory (EPROM), Electrically Erasable Programmable Read-only Memory (EEPROM), registers, hard disk, a removable disk, a Compact Disc (CD)-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication management between RATs sharing operating spectrum in an unlicensed band of radio frequencies.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication management between Radio Access Technologies (RATs) sharing operating spectrum in an unlicensed band of radio frequencies, comprising:
    receiving radio signaling via a communication medium, wherein a first RAT is used to receive the radio signaling;
    identifying utilization of the communication medium associated with the first RAT based on the received radio signaling;
    classifying the identified utilization of the communication medium based on an attribute associated with the received radio signaling and a plurality of thresholds associated with the attribute, wherein the plurality of thresholds define different classes of utilization and different weightings for each of the different classes of utilization; and
    adapting communication by a second RAT over the communication medium based on the classified utilization of the medium.

2. The method of claim 1, wherein the identifying the utilization of the communication medium comprises decoding at least one of a preamble, a Physical (PHY) header, a Medium Access Control (MAC) header, a beacon, a probe request, a probe response, or a combination thereof.

3. The method of claim 1, wherein the identifying the utilization of the communication medium comprises determining at least one of a number of packets associated with the first RAT, a transmission duration for one or more packets associated with the first RAT, or a combination thereof.

4. The method of claim 1, wherein the attribute comprises at least one of a received signal strength associated with a packet of the first RAT, a packet type associated with a packet of the first RAT, a traffic type associated with a packet of the first RAT, a joint attribute associated with two related packets of the first RAT, or a combination thereof.

5. The method of claim 1, wherein the classifying comprises:
    comparing the attribute to at least one of a first threshold or a second threshold among the plurality of thresholds, wherein the first threshold corresponds to a lower value of the attribute and the second threshold corresponds to a higher value of the attribute;
    classifying the identified utilization of the communication medium as a first class among the classes of utilization in response to the comparing indicating that the attribute is below the first threshold;

classifying the identified utilization of the communication medium as a second class among the classes of utilization in response to the comparing indicating that the attribute is between the first threshold and the second threshold; and classifying the identified utilization of the communication medium as a third class among the classes of utilization in response to the comparing indicating that the attribute is above the second threshold.

6. The method of claim 5, wherein the identifying the utilization of the communication medium comprises determining a received signal strength for a packet associated with the first RAT, the first class corresponding to a low received signal strength classification, the second class corresponding to a communication medium received signal strength classification, and the third class corresponding to a high received signal strength classification, the low, medium, and high received signal strength classifications being relative to each other with respect to corresponding values of the received signal strength.

7. The method of claim 5, wherein the adapting comprises setting one or more cycling parameters of a Time Division Multiplexed (TDM) communication pattern defining activated and deactivated periods of transmission for the second RAT, the one or more cycling parameters being set differently for the first, second, and third classes.

8. The method of claim 5, wherein the adapting comprises setting a probability associated with a Listen Before Talk (LBT) backoff trigger, the probability being set differently for the first, second, and third classes.

9. The method of claim 1, wherein the classifying comprises classifying the identified utilization of the communication medium based on first and second attributes associated with the received radio signaling and first and second pluralities of thresholds associated with the first and second attributes, respectively, wherein the first and second pluralities of thresholds define the different classes of utilization.

10. The method of claim 9, wherein the different classes of utilization include different classes for different combinations of first attribute and second attribute values.

11. The method of claim 1, wherein:
the communication medium is an unlicensed radio frequency band;
the first RAT comprises Wi-Fi technology; and
the second RAT comprises Long Term Evolution (LTE) technology.

12. The method of claim 1, further comprising:
utilizing a first transceiver, employing the first RAT, for receiving the radio signaling via the medium; and
utilizing a second transceiver, employing the second RAT, for performing the communication over the medium,
wherein the first transceiver and the second transceiver are co-located at a small cell base station.

13. An apparatus for communication management between Radio Access Technologies (RATs) sharing operating spectrum in an unlicensed band of radio frequencies, comprising:
a first transceiver configured to receive radio signaling via a communication medium, wherein a first RAT is used to receive the radio signaling;
at least one processor;
at least one memory coupled to the at least one processor, the at least one processor and the at least one memory being configured to identify utilization of the communication medium associated with the first RAT based on the received radio signaling, and to classify the identified utilization of the communication medium based on an attribute associated with the received radio signaling and a plurality of thresholds associated with the attribute, wherein the plurality of thresholds define different classes of utilization and different weightings for each of the different classes of utilization; and
a second transceiver configured to adapt communication by a second RAT over the communication medium based on the classified utilization of the medium.

14. The apparatus of claim 13, wherein the at least one processor and the at least one memory are configured to identify the utilization of the communication medium by decoding at least one of a preamble, a Physical (PHY) header, a Medium Access Control (MAC) header, a beacon, a probe request, a probe response, or a combination thereof.

15. The apparatus of claim 13, wherein the at least one processor and the at least one memory are configured to identify the utilization of the communication medium by determining at least one of a number of packets associated with the first RAT, a transmission duration for one or more packets associated with the first RAT, or a combination thereof.

16. The apparatus of claim 13, wherein the attribute comprises at least one of a received signal strength associated with a packet of the first RAT, a packet type associated with a packet of the first RAT, a traffic type associated with a packet of the first RAT, a joint attribute associated with two related packets of the first RAT, or a combination thereof.

17. The apparatus of claim 13, wherein the at least one processor and the at least one memory are configured to classify the identified utilization of the communication medium by:
comparing the attribute to at least one of a first threshold or a second threshold among the plurality of thresholds, wherein the first threshold corresponds to a lower value of the attribute and the second threshold corresponds to a higher value of the attribute;
classifying the identified utilization of the communication medium as a first class among the classes of utilization in response to the comparing indicating that the attribute is below the first threshold;
classifying the identified utilization of the communication medium as a second class among the classes of utilization in response to the comparing indicating that the attribute is between the first threshold and the second threshold; and
classifying the identified utilization of the communication medium as a third class among the classes of utilization in response to the comparing indicating that the attribute is above the second threshold.

18. The apparatus of claim 17, wherein the at least one processor and the at least one memory are configured to identify the utilization of the communication medium by determining a received signal strength for a packet associated with the first RAT, the first class corresponding to a low received signal strength classification, the second class corresponding to a communication medium received signal strength classification, and the third class corresponding to a high received signal strength classification, the low, medium, and high received signal strength classifications being relative to each other with respect to corresponding values of the received signal strength.

19. The apparatus of claim 17, wherein the second transceiver is configured to adapt the communication by setting one or more cycling parameters of a Time Division Multiplexed (TDM) communication pattern defining activated and deactivated periods of transmission for the second RAT, the one or more cycling parameters being set differently for the first, second, and third classes.

20. The apparatus of claim 17, wherein the second transceiver is configured to adapt the communication by setting a probability associated with a Listen Before Talk (LBT) backoff trigger, the probability being set differently for the first, second, and third classes.

21. The apparatus of claim 13, wherein the at least one processor and the at least one memory are configured to classify the identified utilization of the communication medium by classifying the identified utilization of the communication medium based on first and second attributes associated with the received radio signaling and first and second pluralities of thresholds associated with the first and second attributes, respectively, wherein the first and second pluralities of thresholds define the different classes of utilization.

22. The apparatus of claim 21, wherein the different classes of utilization include different classes for different combinations of first attribute and second attribute values.

23. The apparatus of claim 13, wherein:
the communication medium is an unlicensed radio frequency band;
the first RAT comprises Wi-Fi technology; and
the second RAT comprises Long Term Evolution (LTE) technology.

24. The apparatus of claim 13, wherein the first transceiver and the second transceiver are co-located at a small cell base station.

25. An apparatus for communication management between Radio Access Technologies (RATs) sharing operating spectrum in an unlicensed band of radio frequencies, comprising:
means for receiving radio signaling via a communication medium, wherein a first RAT is used to receive the radio signaling;
means for identifying utilization of the communication medium associated with the first RAT based on the received radio signaling;
means for classifying the identified utilization of the communication medium based on an attribute associated with the received radio signaling and a plurality of thresholds associated with the attribute, wherein the plurality of thresholds define different classes of utilization and different weightings for each of the different classes of utilization; and
means for adapting communication by a second RAT over the communication medium based on the classified utilization of the medium.

26. The apparatus of claim 25, wherein the attribute comprises at least one of a received signal strength associated with a packet of the first RAT, a packet type associated with a packet of the first RAT, a traffic type associated with a packet of the first RAT, a joint attribute associated with two related packets of the first RAT, or a combination thereof.

27. The apparatus of claim 25, wherein the means for classifying comprises:
means for comparing the attribute to at least one of a first threshold or a second threshold among the plurality of thresholds, wherein the first threshold corresponds to a lower value of the attribute and the second threshold corresponds to a higher value of the attribute;
means for classifying the identified utilization of the communication medium as a first class among the classes of utilization in response to the comparing indicating that the attribute is below the first threshold;
means for classifying the identified utilization of the communication medium as a second class among the classes of utilization in response to the comparing indicating that the attribute is between the first threshold and the second threshold; and
means for classifying the identified utilization of the communication medium as a third class among the classes of utilization in response to the comparing indicating that the attribute is above the second threshold.

28. A non-transitory computer-readable medium comprising instructions, which, when executed by a processor, cause the processor to perform operations for communication management between Radio Access Technologies (RATs) sharing operating spectrum in an unlicensed band of radio frequencies, the non-transitory computer-readable medium comprising:
instructions for receiving radio signaling via a communication medium, wherein a first RAT is used to receive the radio signaling;
instructions for identifying utilization of the communication medium associated with the first RAT based on the received radio signaling;
instructions for classifying the identified utilization of the communication medium based on an attribute associated with the received radio signaling and a plurality of thresholds associated with the attribute, wherein the plurality of thresholds define different classes of utilization and different weightings for each of the different classes of utilization; and
instructions for adapting communication by a second RAT over the communication medium based on the classified utilization of the medium.

29. The non-transitory computer-readable medium of claim 28, wherein the attribute comprises at least one of a received signal strength associated with a packet of the first RAT, a packet type associated with a packet of the first RAT, a traffic type associated with a packet of the first RAT, a joint attribute associated with two related packets of the first RAT, or a combination thereof.

30. The non-transitory computer-readable medium of claim 28, wherein the instructions for classifying comprise:
instructions for comparing the attribute to at least one of a first threshold or a second threshold among the plurality of thresholds, wherein the first threshold corresponds to a lower value of the attribute and the second threshold corresponds to a higher value of the attribute;
instructions for classifying the identified utilization of the communication medium as a first class among the classes of utilization in response to the comparing indicating that the attribute is below the first threshold;
instructions for classifying the identified utilization of the communication medium as a second class among the classes of utilization in response to the comparing indicating that the attribute is between the first threshold and the second threshold; and
instructions for classifying the identified utilization of the communication medium as a third class among the classes of utilization in response to the comparing indicating that the attribute is above the second threshold.

* * * * *